(12) United States Patent
Estelle et al.

(10) Patent No.: US 6,380,861 B2
(45) Date of Patent: Apr. 30, 2002

(54) TEMPERATURE MONITOR FOR ELECTRICALLY OPERATED FLUID DISPENSER AND METHOD

(75) Inventors: Peter W. Estelle, Norcross; Laurence B. Saidman, Duluth, both of GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/754,627

(22) Filed: Jan. 4, 2001

Related U.S. Application Data

(62) Division of application No. 09/533,347, filed on Mar. 23, 2000.

(51) Int. Cl.[7] .............................................. G08B 17/00
(52) U.S. Cl. .................... 340/588; 340/595; 340/691.3; 340/815.65; 374/152
(58) Field of Search ................................ 340/584, 595, 340/664, 691.3, 691.4, 332, 815.65, 815.45, 870.17, 588; 374/152

(56) References Cited

U.S. PATENT DOCUMENTS

| | | | |
|---|---|---|---|
| 4,437,488 A | 3/1984 | Taggart et al. | 137/334 |
| 4,602,872 A * | 7/1986 | Emery et al. | 374/152 |
| 5,535,919 A | 7/1996 | Ganzer et al. | 222/1 |
| 5,875,922 A | 3/1999 | Chastine et al. | 222/1 |

* cited by examiner

Primary Examiner—Thomas Mullen
(74) Attorney, Agent, or Firm—Wood, Herron & Evans, L.L.P.

(57) ABSTRACT

A temperature monitor for monitoring a temperature of an electrically operated fluid dispenser having a coil mounted adjacent an armature within the dispenser. The coil selectively generates an electromagnetic field to move the armature between opened and closed positions. The temperature monitor includes current measuring apparatus for measuring a current in the coil and a comparator for comparing a measured current value to a desired current value. An indicator provides an indication representing a relationship between the measured current value and the desired current value. The temperature monitor also has different indicators for providing different indications representing different values of the measured current relative to a desired current value.

20 Claims, 7 Drawing Sheets

TEMPERATURE MONITOR FOR ELECTRICALLY OPERATED FLUID DISPENSER AND METHOD

This application is a Division of U.S. Ser. No. 09/533,347, entitled "Electrically Operated Viscous Fluid Dispensing Apparatus and Method", filed Mar. 23, 2000, and is hereby expressly incorporated herein by reference in its entirety.

FIELD OF THE INVENTION

The present invention generally relates to an apparatus for dispensing viscous fluids and more specifically, to an electrically operated apparatus for dispensing viscous liquids, such as hot melt adhesives.

BACKGROUND OF THE INVENTION

Pneumatic and electric viscous fluid dispensers have been developed for dispensing applications requiring precise placement of a viscous fluid. Pneumatic dispensers have a significant advantage in that the pneumatic solenoid operating the dispensing valve can be made very strong, so that the dispensing valve operation is essentially independent of the viscosity of the fluid being dispensed. However, pneumatic dispensers have disadvantages in that they generally have a shorter life than electric fluid dispensers, and the operation of the pneumatic solenoid is subject to less precise control than the electric solenoid in an electric fluid dispenser. Therefore, in some applications, electrically operated viscous fluid dispensers are preferred over pneumatic viscous fluid dispensers.

Generally, electrically operated dispensers include an electromagnetic coil surrounding an armature that is energized to produce an electromagnetic field with respect to a magnetic pole. The electromagnetic field is selectively controlled to open and close a dispensing valve by moving a valve stem connected to the armature. More specifically, the forces of magnetic attraction between the armature and the magnetic pole move the armature and valve toward the pole, thereby opening the dispensing valve. At the end of a dispensing cycle, the electromagnet is de-energized, and a return spring returns the armature and valve stem to their original positions, thereby closing the dispensing valve.

In the operation of an electric viscous fluid dispensing gun, the coupling between the coil and the armature is not efficient; and therefore, in order to achieve the highest actuation speed, a current pulse or spike is typically provided to the coil during an initial turn-on period in order to initiate the motion of the armature as quickly as possible. However, maintaining such a level of current to the coil quickly and substantially increases coil temperature. Further, maintaining such a high level of current increases the time required for the energy stored in the coil's inductance to dissipate, thereby increasing the turn-off time and the time required to close the fluid dispenser. Therefore, after the initial current spike, the current through the coil is normally reduced to approximately the minimum value required to hold the armature in its open position by overcoming the opposing force of the return spring. Such a stepped current waveform is useful in reducing the current induced heat load in the coil, thereby allowing the coil to operate at a lower temperature than if the stepped waveform were not used. However, as is described below, the operation of the coil and armature during the fluid dispensing process creates other heat related issues that impact the quality of the fluid dispensing process.

The continued development and use of viscous fluid electric dispensers has resulted in more demanding performance specifications as well as a greater understanding of how heat in the dispenser can potentially effect performance. For example, the electric coil of an electric dispensing valve normally is not capable of providing the same forces as a pneumatic solenoid and therefore, is more subject to changes in resistance to valve stem motion that may be caused by changes in viscosity of the fluid being dispensed. Thus, as the viscosity of the fluid being dispensed changes, the load on the electromagnetic coil changes, and the time required to open and close the dispensing valve will likewise change. Such changes in timing of the dispensing valve opening and closing will change the location of the adhesive being dispensed on the substrate.

In addition to the above, newer applications have more demanding performance specifications and require ever-increasing gun speeds, that is, a shortening of the time required to open and close the dispensing valve. The operational speed of the dispensing valve can be increased by increasing the electrical power applied to the electric coil operating the valve. The electrical power is normally increased by increasing the current being supplied to the coil which also adds heat to the coil, thereby causing the temperature of the coil to rise. A hotter or higher coil temperature impacts the consistency of the viscous fluid dispensing in several ways. First, heat from the coil is conducted through the armature and the valve stem which is adjacent the valve seat and is surrounded by the viscous fluid. As the temperature of the armature fluctuates, for example, goes up, the viscosity of the fluid to be dispensed likewise fluctuates and, in this example, decreases, thereby changing the flow of the viscous fluid from the dispenser.

Second, the speed at which the armature can be moved between the open and closed positions is a function of the rate of change of current in the coil, which, in turn, is controlled by the electrical time constant of the coil. The electrical time constant is a function of the coil resistance which, in turn, is a function of temperature. The coil utilized in the viscous fluid dispenser discussed herein can experience an approximately 50% variation in resistance over its normal range of operating temperature. Such a change in resistance substantially affects the electrical time constant of the coil, thereby similarly affecting the speed at which the coil can open and close the valve.

The thermal time constant of the coil is a function of the coil mass and its thermal connections to surrounding materials such as the gun body and ambient temperature. The thermal time constant of the coil and its surrounding thermal system affects the time required for the thermal system to reach a steady state condition. When the dispensing system is running at a constant speed, and a steady state condition is achieved, the thermal time constant normally does not present a source of variation in the operation of the dispensing coil. However, the steady state condition can change for several reasons, for example, if the production line speed is either increased or decreased or, the dispensing gun is not operating and in the standby mode. Either of those conditions causes the coil temperature to change, and the thermal time constant presents a source of variations in the operation of the viscous fluid dispenser.

Of further concern is the maximum temperature rating of the coil wire insulation. Under normal operating conditions, the temperature rating of the wire insulation exceeds the wire temperature. However, in a worse case situation, if the temperature of the wire exceeds the temperature rating of the wire insulation, the integrity of the coil wire insulation may be compromised, thereby causing coil windings to short-circuit together. Any coil windings that short-circuit together will change the resistance of the coil and potentially adversely effect the consistency of the fluid dispensing operation of the dispenser.

Thus, by using a stepped current waveform, known electric fluid dispensers attempt to reduce the temperature of the coil. Further, it is known to utilize a heater in a manifold to which the fluid dispenser is mounted to control the temperature of the fluid circulating through the manifold and the fluid dispenser, thereby indirectly controlling the temperature of the dispenser itself. However, as will be appreciated, there have been no attempts to control the temperature of the fluid dispenser directly with a self contained device in order to maintain the electric fluid dispenser at a constant temperature.

SUMMARY OF INVENTION

The present invention provides an improved electric dispenser for viscous fluids that manages the thermal condition of the dispenser directly to provide a substantially improved, more consistent dispensing of viscous fluids. The electric dispenser of the present invention provides more consistent actuation of the dispensing valve independent of changes in the speed of operation of the dispenser. The electric fluid dispenser of the present invention reduces the range of temperature fluctuations resulting from changes in speed of the production line and changes in the frequency of operation of the fluid dispenser. Further, the electric fluid dispenser of the present invention maintains a generally constant coil temperature independent of the rate of gun operation. Providing a fluid dispenser that has a self-contained temperature control that reduces the range of temperature variations helps to maintain the viscosity of the fluid within the dispenser constant. By better controlling the temperature within the electric viscous fluid dispenser, a more consistent, faster and reliable operating cycle is achieved. Thus, the electric dispenser of the present invention provides the advantage of dispensing a viscous fluid more accurately, precisely and with a higher quality than was heretofore possible.

In accordance with the principles of the present invention and the described embodiments, the invention in one embodiment provides an electrically operated fluid dispenser for dispensing a viscous fluid onto a substrate during a run mode. The dispenser includes a body having an outlet and an armature disposed in the dispenser body for movement between an opened position allowing a fluid flow from the outlet and a closed position preventing the fluid flow from the outlet. A coil is mounted adjacent the armature and selectively generates an electromagnetic field for moving the armature between the opened and closed positions. A controller is connected to the coil and provides output signals to energize a coil positioned with respect to an armature within the fluid dispenser with a drive current to actuate the fluid dispenser and to simultaneously maintain the coil at an approximately constant temperature during the run mode.

In one aspect of the one embodiment, the controller includes power switches providing a drive current signal to the coil and a thermal controller providing a current waveform signal to the power switches. The current waveform signal operates the power switches to maintain the coil at a constant temperature in response to a temperature control loop.

In another aspect of the one embodiment, a heat transfer device is mounted in a heat transfer relationship with the dispenser body; and the controller is connected to the heat transfer device to cause the heat transfer device to selectively transfer heat between the heat transfer device and the dispenser body during the run and standby modes, thereby maintaining the dispenser body at a constant temperature during the run and standby modes.

In a second embodiment of the invention, the dispenser is turned off and does not dispense the viscous fluid during a standby mode of operation; and the controller provides further output signals to energize the coil with a current to maintain the coil at an approximately constant temperature during the standby mode.

In another embodiment of the invention, the coil has first and second windings disposed adjacent the armature, the controller selectively provides output signals to the first and second windings of the coil to cause current flow in the coil windings during the run and standby modes. The controller further includes a switching apparatus selectively placing the first and second windings in an additive relationship during the run mode to move the armature between the opened and closed positions and in an opposing relationship during the standby mode to maintain the armature immobile in the closed position.

In one aspect of this other embodiment, the controller includes power switches providing a drive current signal to the coil; and a thermal controller for provides a current waveform signal to the power switches. The current waveform signal operates the power switches to maintain the coil at a constant temperature. The thermal controller generates the current waveform signal in response to changes in either power, current or temperature variables with respect to a respective desired value of those variables.

In another aspect of this other embodiment, the controller includes a high frequency power supply and a switching device connected between the power switches, the coil and the high frequency power supply. The switching device connects the coil to the power switches during the run mode and connects the coil to the high frequency power supply during the standby mode.

In a further aspect of this other embodiment, the controller includes power switches for connecting the coil windings in parallel across a power supply to permit the duty cycle of the current flow in each of the coil windings to be individually controlled, thereby uncoupling and independently controlling the power heating of the coil from the actuation power provided by the coil windings.

In a still further embodiment of the invention, a method is provided for operating an electric viscous fluid dispenser to maintain a coil positioned with respect to an armature within the dispensing gun at an approximately constant temperature during the run mode by heating the coil. In an additional embodiment, the above method includes maintaining the coil at an approximately constant temperature while the viscous fluid is not being distributed during a standby mode by heating the coil during the standby mode. In different aspects of this invention, the coil is heated during the run and standby modes by current flowing through the coil or by a separate heating and cooling heat transfer device. In a further aspect of the invention, the heating of the coil is controlled by an RMS value of the current in the coil.

The above embodiments of a fluid dispenser temperature controller have the advantages of reducing the range of temperature variations within the fluid dispenser and normally, maintaining the temperature of the fluid dispenser approximately constant. Thus, the fluid dispenser temperature controller does not rely on the user being able to control the best current waveform parameters, but instead, is adaptive and self-adjusting to maintain a constant coil temperature. The active temperature control protects the coil from overheating in the event that the user adjusts the current waveform such that an excessive temperature would otherwise be produced. With a constant coil temperature, the viscosity of the fluid within the dispensing gun is held more consistent, thereby improving the consistency of the dispensing process. Further, by maintaining the constant temperature over the full range of operating frequency of the dispensing gun, the coil temperature controller provides a further advantage of providing a higher quality and more consistent viscous fluid dispensing operation. In addition, such a temperature control permits the dispensing gun to be consistently operated at a rate that is very close to, if not at, the theoretical maximum temperature limit of the gun without overheating.

In a further embodiment of the invention, an electrically operated fluid dispenser has a body with a heater and a fluid passage intersecting first and second sides of the body and a dispensing outlet in fluid communication with the fluid passage. The dispenser includes a feed member having a fluid passage intersecting ends of the feed plate. One end of the feed member is mounted to the first side of the body with one end of the fluid passage in the feed member fluidly connecting with one end of the fluid passage in the body. The dispenser also has a cap mounted to the second side of the body to terminate the fluid passage on the second side of the body.

In one aspect of this further embodiment, the dispenser includes a second dispenser with a body having a heater, a fluid passage intersecting first and second sides of the second body and a dispensing outlet in fluid communication with the fluid passage. The first side of the second body is mounted to the second side of the first body with one end of the fluid passage in the second dispenser body fluidly connecting with an opposite end of the fluid passage in the first dispenser body.

In other aspects of this further embodiment, the dispenser includes a spacer plate disposed between the first and second bodies, and the heater is comprised of either a coil mounted with respect to an armature within the body or, a heating and cooling heat transfer device.

This further embodiment of the invention with the use of the coil heater has the advantage of maintaining the viscous fluid within the passage at the desired temperature without requiring a separate fluid distribution manifold plate to which the dispensing gun is normally mounted. A dispensing gun of this construction has the further advantage of being substantially more compact than the traditional manifold plate design. Further, the construction of the dispensing gun is substantially less expensive; and its simpler construction provides substantially greater flexibility in mounting the dispensing gun with associated equipment.

In yet another embodiment of the invention, a temperature monitor for monitoring a temperature of an electrically operated fluid dispenser has a coil mounted adjacent an armature within the dispenser, the coil selectively generates an electromagnetic field to move the armature between opened and closed positions. The temperature monitor includes current measuring apparatus for measuring a current in the coil and a comparator for comparing a measured current value to a desired current value. An indicator provides an indication representing a relationship between the measured current value and the desired current value.

In different aspects of this embodiment, the temperature monitor measures the RMS value of the current in the coil and has different indicators for providing different indications representing different values of the measured current relative to a desired current value.

The thermal monitor has the advantage of providing the user with a real time indication of whether the user's adjustments to the current waveform provide a coil temperature that is less than, close to or in excess of the maximum coil temperature. In addition, the thermal monitor has the further advantage of helping the user select the temperature limits which are appropriate for the dispensing gun being used and the dispensing application being effected.

Various additional advantages, objects and features of the invention will become more readily apparent to those of ordinary skill in the art upon consideration of the following detailed description of the presently preferred embodiments taken in conjunction with the accompanying drawings.

DETAILED DESCRIPTION OF PREFERRED EMBODIMENTS

Figure 1:
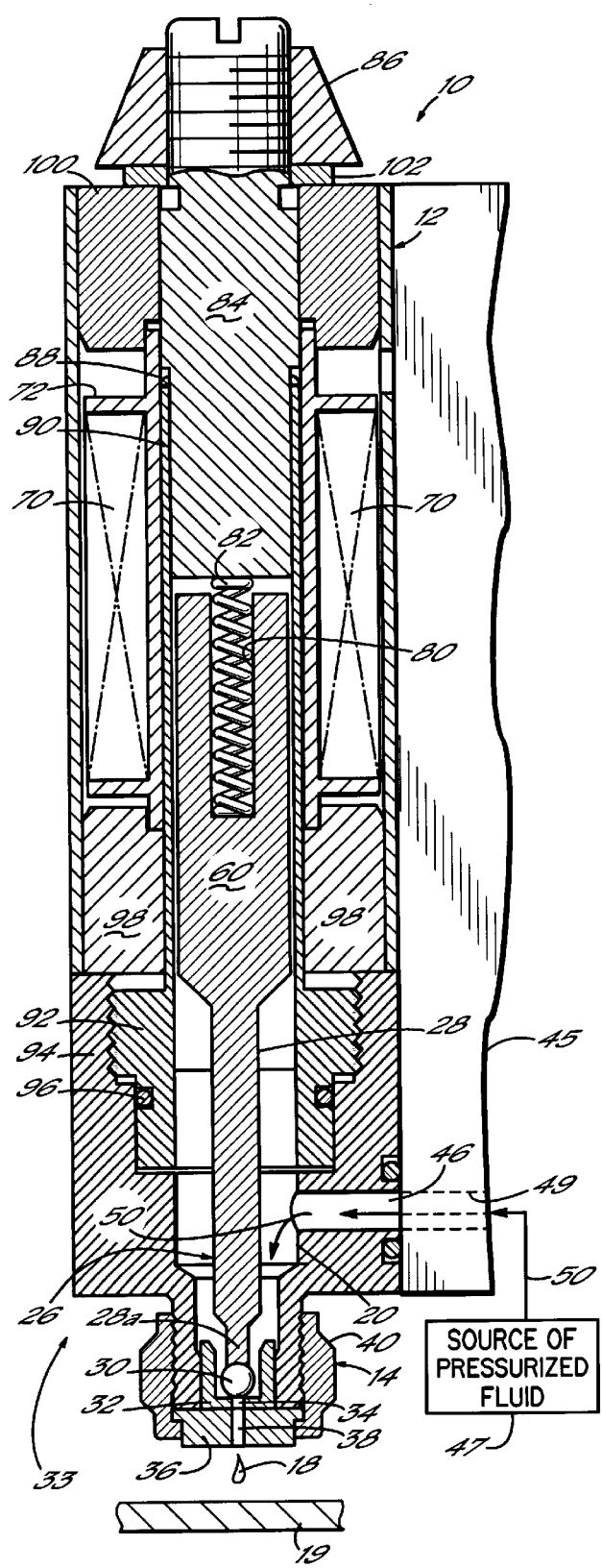
FIG. 1 is an axial cross-sectional view of an electrically operated fluid dispenser constructed according to the invention.

Referring first to FIG. 1, an electrically operated viscous fluid dispenser or dispensing gun 10 comprises one or more dispensing modules or valves 33 mounted on a fluid distribution manifold plate 45 in a known manner. The dispensing valve 33 includes a dispenser body 12 and a fluid dispensing nozzle body 14. The dispenser 10 is adapted for dispensing high viscosity fluids, such as a hot melt adhesive, but other dispensed fluids can benefit from the invention as well. Such other fluids include soldering fluxes, thermal greases, heat transfer compounds and solder pastes. Furthermore, the dispenser 10 is mounted in a dispensing machine or system (not shown) in a known manner to dispense fluids in discrete amounts, preferably as droplets or dots, but alternatively in continuous beads. As shown in FIG. 1, the dispenser body 12 used in conjunction with the fluid dispensing nozzle body 14 is particularly constructed to dispense droplets 18 of the viscous fluid onto a substrate 19. Relative motion between the substrate 19 and dispenser 10 is provided in a known manner.

A valve stem 26 is mounted in an interior portion 20 of the dispenser body 12, and the valve stem includes a shaft 28 through the interior portion 20. A ball 30 is mounted to a lower end 28a of the shaft 28 which is shown in FIG. 1 in sealing engagement with a valve seat 32 positioned in the nozzle body 14. Thus, the valve stem 26 and ball reciprocate between opened and closed positions with respect to the valve seat 32, thereby operating as a dispensing valve 33. With the ball 30 sealingly engaging valve seat 32, high viscosity fluid, such as an epoxy, cannot flow through an outlet 34 in the valve seat 32. The nozzle body 14 also has a nozzle tip 36 with an orifice 38 aligned with the outlet 34 and flush mounted to the valve seat 32 by a threaded retaining nut 40. The nozzle tip 36 can be readily exchanged with a different nozzle tip to produce droplets of a different size and, in some cases, a different shape.

A fluid inlet passageway 46 intersects the interior portion 20 and is connected to a fluid passage 49 in the manifold 45 which in turn is fluidly connected to a source 47 of hot melt adhesive which normally is pressurized. Arrows 50 indicate the flow path of the fluid entering through the fluid inlet passageway 46 and through the interior portion 20.

An armature 60 is disposed within the interior portion 20 and is coaxially aligned with and, preferably, formed integrally with shaft 28. An electromagnetic coil 70 is disposed about the armature 60. Although any suitable electromagnetic coil could be used, it is contemplated that the electromagnetic coil 70 will be generally toroidal in shape. The coil 70 is contained in a housing 72 and connected to a power source (not shown). When supplied with electrical current, the coil 70 generates an electromagnetic field which actuates the valve stem 26 to an open position as will be described below.

A bore 80 extends into the armature 60 to house a return spring 82. The return spring 82 biases the valve stem 26 and, more specifically, the ball 30, to sealingly engage the valve seat 32 in a closed position. The return spring 82 is normally a compression spring which is placed under compression within the bore 80 through engagement with an electromagnetic pole 84. To achieve an opened position, the electromagnetic coil 70 must generate a sufficient electromagnetic field between the armature 60 and the pole 84 so as to attract the armature 60 and the pole 84 together. Since the pole 84 cannot move, the armature 60 will move against the force of the spring 82 until it hits the pole 84. The stroke length is the distance between the armature 60 and the pole 84 as shown in FIG. 1. An adjustment nut 86 provides a means to initially set the stroke length. More specifically, brazing 88 connects the pole 84 to a tubular member 90. The tubular member 90 has a lower threaded portion 92 received within an internally threaded lower housing portion 94. A tool, such as a screwdriver, may be used to turn the pole 84 and, therefore, the tubular member 90, as an O-ring 96 slides against an interior surface of the lower housing portion 94. This adjustment varies the distance between the lower end of the pole 84 and the upper end of the armature 60 or, in other words, varies the stroke length of the valve stem 26. A lower donut 98 is disposed about the tubular member 90 and rests against an upper side of the lower housing portion 94 while an upper donut 100 is held against the coil housing 72 by the nut 86 and a lock washer 102. Such a dispenser 10 is further described in commonly-assigned, U.S. Pat. No. 5,875,922, entitled APPARATUS FOR DISPENSING AN ADHESIVE, issued on Mar. 2, 1999, which is hereby incorporated by reference herein in its entirety.

Figure 2A:
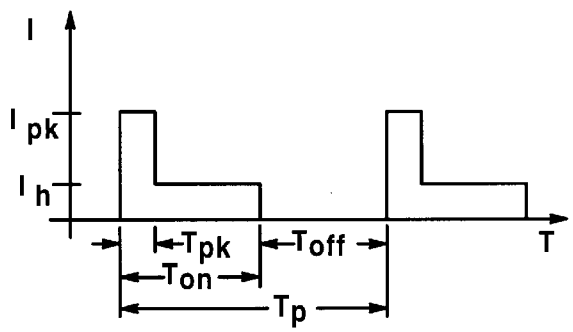
FIGS. 2A–2D are schematic diagrams of current waveform signals used to provide a drive current signal to the coil of the dispensing valve of FIG. 1.

As previously discussed, electric guns are preferred because of the precision with which they may be controlled during a manufacturing operation. However, electric guns have a disadvantage in that temperature variations within the gun directly effect the guns' performance. Further, known electric fluid dispensers apply a stepped current waveform to the coil that has an initial spike and then steps down to a magnitude sufficient to hold the valve stem 28 in its open position by overcoming the opposing force of the return spring 82. A series of such current waveform signals is schematically illustrated in FIG. 2A. To turn the gun on, thereby opening the dispensing valve 33, an initial current magnitude $I_{pk}$ is applied for a duration or period of time $T_{pk}$ in response to a trigger pulse. Thereafter, the current is reduced to a lesser hold level $I_h$ for the remaining period of the on-time $T_{on}$. The zero current value is then maintained for an off-time $T_{off}$ during the remaining time of the current waveform period $T_p$. As will be appreciated, the waveform illustrated in FIGS. 2A–2D is for purposes of discussion and the real waveform consists of exponential functions that transition the current between levels. The real time on-time wave shape can look radically different from the idealized waveform of FIG. 2A–2D, depending on many factors such as $I_{pk}$, $I_h$, $T_{pk}$, $T_{on}$, $T_p$, $L_{coil}$, $R_{coil}$, etc. The $T_{on}$ and $T_p$ are related to the adhesive pattern required for a particular product. The inductance and resistance of the coil are a function of the gun itself, and the $I_{pk}$ is normally bounded by the limits of magnetic saturation of the dispensing gun 10.

The current waveform period $T_p$ is inversely related to frequency. Thus, as the frequency of the trigger pulses increases, the period $T_p$ of the current waveform decreases. Thus, over time, coil heating is a function of the frequency of operation of the dispensing gun 10, the peak current magnitude $I_{pk}$, the duration of the peak current $T_{pk}$, the magnitude of the hold current $I_h$ and the current waveform on-time $T_{on}$. Initial values of magnitudes of the peak and hold currents are based on the coil specifications, however, the peak current magnitude $I_{pk}$, the magnitude of the hold current $I_h$ and the duration of the peak current $T_{pk}$ are all adjustable by the user. The user often adjusts the current waveform and the dispensing line rate in order to tune the dispensing operation to its peak performance. However, the user has no real time feedback as to the effects of such adjustments on the coil temperature which, as discussed earlier, can have adverse effects on the quality of the dispensing process. Thus, such system tuning is also influenced by other constantly changing conditions which make such adjustments not repeatable and somewhat of an art form.

The present invention actively controls the current waveform parameters over substantially the full range of operation of the dispensing gun 10, so that the coil temperature is maintained at a constant value less than a maximum coil temperature. If coil temperature is maintained constant for different triggering frequencies, the adverse effects of changes in coil temperature are eliminated, thereby providing a more consistent and precise viscous fluid dispensing operation.

Figure 3:
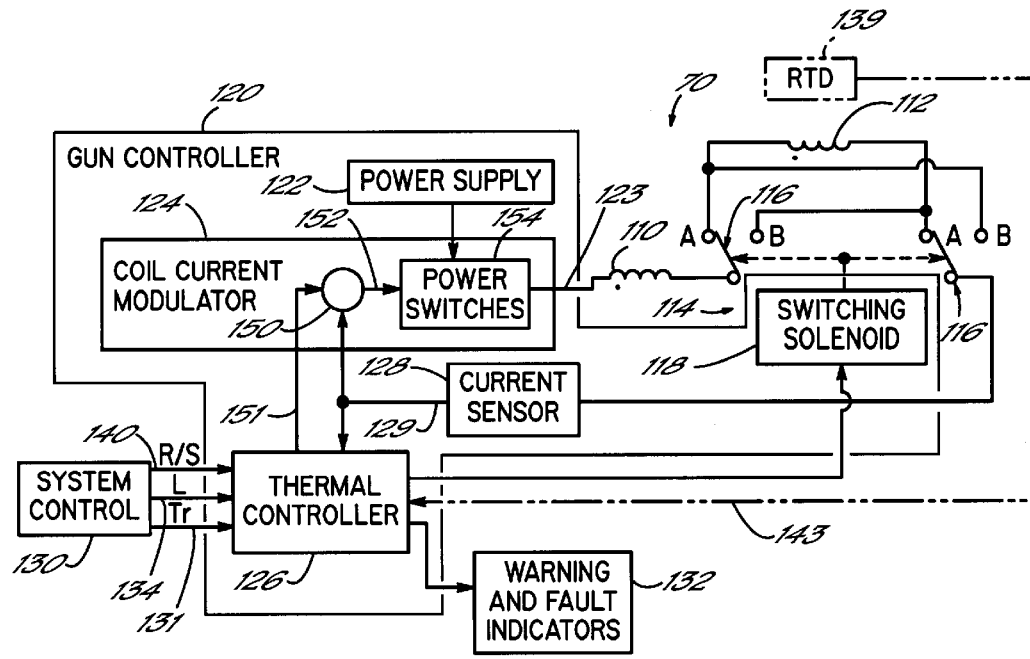
FIG. 3 is a schematic block diagram of a gun controller that includes a thermal controller for controlling the temperature of the dispensing valve coil in accordance with the principles of the present invention.

One embodiment for regulating coil temperature is illustrated in FIG. 3 in which the coil 70 is a bifilar coil, that is, a coil having two independent coil windings 110, 112. The coil windings are connected by a switching device 114 which can be implemented using switching relay or semiconductor switches such as MOSFET, IBGT, BJT, etc. In FIG. 3, the switching device 114 is illustrated as a switching relay comprised of switching contacts 116 and a switching solenoid 118. During a run mode during which fluid is being dispensed, the switching device 114 connects the coil windings 110, 112 via the contacts A such that the first coil winding 110 is in series with the second coil winding 112, and the current therethrough flows in a common direction with respect to the coil polarity of the coil windings 110, 112. In a standby mode, the dispensing gun 10 is inactive; and therefore, in response to a standby signal, the switching device 114 switches the coil winding 112 to contacts B, thereby connecting the coil windings 110, 112 in opposition. Thus, during the standby mode, current flows through coil winding 110 in one direction with respect to its coil polarity, however, current flows in the opposite direction in winding 112 with respect to its coil polarity. The flux fields created by windings 110 and 112 oppose and cancel each other. With a net flux of zero, the current flow through the coil 70 is unable to overcome the force of the return spring 82. Consequently, during the standby mode, the armature is maintained immobile in the presence of current flow through the coil 70, and the dispensing valve 33 remains in its closed position. Consequently, a substantially constant current flows through the coil 70 at all times independent of the dispensing operation of the dispensing valve 33, thereby maintaining a substantially constant temperature within the coil 70.

Referring to FIG. 3, the coil 70 is connected to a gun controller 120 including a power supply 122, a coil current modulator 124, a thermal controller 126 and a current sensor 128. The current sensor 128 can implement one of many current measuring methods including using a simple resistor, a Hall effect device, a current transformer, etc. The gun controller 120 is further connected to a machine or system control 130 and provides output signals to warning and fault indicators 132 which may be included within the gun controller 120 or a part of other devices, for example, the system control 130. The system control 130 includes all of the other known dispensing system or machine controls necessary for the operation of the dispensing system. The system control 130 also includes input devices such as a keypad, pushbuttons, etc. and output devices such as a display, indicator lights, etc. that provide communication links with a user in a known manner. The thermal controller 126 can be implemented using analog or digital circuit components; however, the thermal controller is normally implemented with a programmable microcomputer control that operates in response to stored program instructions as well as signal inputs to the controller 126.

Figure 4:
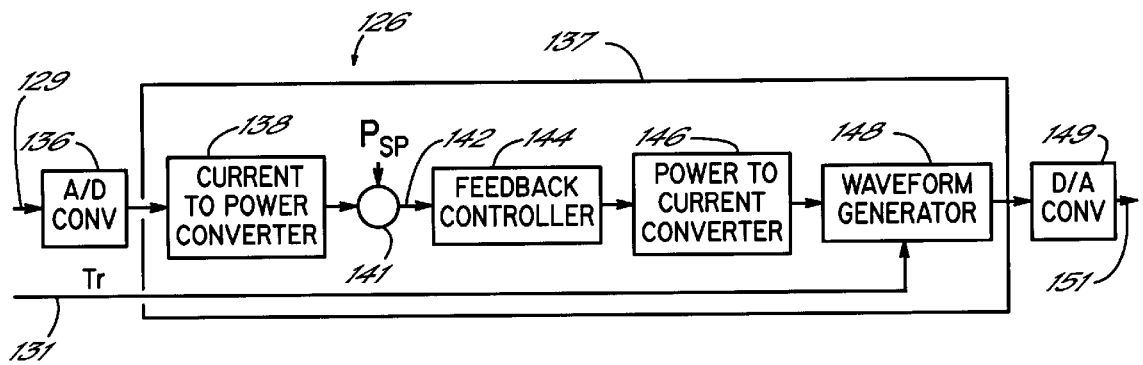
FIG. 4 is a schematic block diagram of one embodiment of the thermal controller of FIG. 3.

In this embodiment of the invention, in order for the temperature of the coil 70 to remain constant, the power being supplied to the coil should also be constant. The power to the coil can theoretically be no more than the power being supplied to the coil with the production line running at its maximum rate. In order to determine that power value, the gun controller 120 executes a learn mode of operation which is typically initiated by the user actuating a switch on the system control 130 that provides a learn signal on an output 130 to the gun controller 120. A schematic functional block diagram of one embodiment of a portion of the thermal controller 126 is illustrated in FIG. 4. The thermal controller 126 includes a power control 137 that is implemented with a programmable microprocessor control having programmed instructions to implement the devices shown within the control 137. The learn mode process executed by the thermal controller of FIG. 4 is illustrated by the flow chart illustrated in FIG. 5. The first step, at 502, of the learn mode process is to operate the dispensing gun 10 at its maximum rate. Normally, the system control 130 is used to run the production line at its maximum rate which, in turn, causes the dispensing gun 10 to also operate at its maximum rate.

The dispensing gun 10 is operated in response to a trigger pulse suppled on output 131 from the system control 130. With each trigger pulse, a waveform signal, as illustrated in FIG. 2A, is provided by a waveform generator 148. The waveform signal, for example, a current waveform, determines the waveform of an output signal, for example, a drive current, that is provided by the coil current modulator 124. The values of $I_{pk}$ and $T_{pk}$ are generally chosen as a function of the viscosity of the fluid being dispensed. Further, the value of the hold current $I_h$ is set to a nominal value equal to the minimum current required to hold the valve in the open position, that is, the minimum value of current to overcome the biasing force of the compressed spring 82 (FIG. 1). That current waveform passes through the D/A converter 149 and from the thermal controller 126 on an output 151. The current waveform then drives power switches 154 in the coil current modulator 124 to provide the desired current or power from the power supply 122 to the coil 70. Thus, the dispensing valve 33 is operated at the maximum frequency that would be expected in the current application. Alternatively, it may be possible to use the system control 130 to operate the dispensing valve 33 independently of the production line. Next, at 503, the rate at which trigger pulses are being generated at the maximum frequency is stored in the system control 130. As will be appreciated, this process step is optional depending on how current is applied to the coil in the standby mode of operation.

When operating in the learn mode, the maximum current or power being consumed by the dispensing gun 10 must be identified to establish a power target or setpoint for the control of the gun during the run or dispensing mode of the dispensing gun 10. Thus, the next step 504 in the learn mode is to measure the current flow through the coil 70 while the gun is operating at its maximum rate. In one aspect of the invention, the current is measured by a current sensor 128, and a measured current value on an output 129 is provided to the controller 126 by means of an A/D converter 136 of FIG. 4. The digital current value from the A/D converter 136 is then sampled, averaged and stored. The RMS value of the current or the voltage at the coil is a measure of the heating power in the coil. Therefore, normally, the RMS value of the current is computed, which provides a value that is very representative of the temperature of the coil. As is appreciated, computing the RMS value of the current consumes significant resources within the control 137. Therefore, alternatively, the current sensor 128 output can be input to an integrated circuit chip that senses the current and provides a DC voltage output having a magnitude value proportional to the RMS value of the sensed current. Such an integrated circuit chip is illustrated as chip 180 in FIG. 11, and an output 188 from the chip 180 is then an input to the A/D converter 136.

The learn mode at 506 then requires a computation of the coil power at the maximum gun operating rate. The coil power is determined within the controller 126 by a current-to-power converter 138. As will be appreciated, any known relationship between current, voltage, coil resistance and power may be used to compute the power, however, the power is normally computed utilizing the formula $P=I^2_{coil} \times R_{coil}$. Thus, the resistance of the coil is required for the power computation. The resistance of the coil can be determined in one of several ways. First, a previously determined and stored coil resistance value can be read from a store (not shown) within the processor 126 and used in the current-to-power conversion. However, as discussed earlier, the resistance of the coil is a function of the coil temperature. Therefore, alternatively, a table correlating coil temperature to coil resistance values may be stored in the controller 126, and a temperature sensor 139, shown in phantom in FIG. 3, mounted in a heat transfer relationship with the coil 70 can be used to detect the temperature of the coil. In this aspect of the invention, the temperature sensor 139 is read by the controller 126 and a comparable coil resistance read from the table.

Alternatively, the resistance of the coil can be calculated in real time based on temperature measurements from the sensor 139 in accordance with the equation $R_h=R_c(1+\alpha(T_h-T_c))$, where $R_h$ and $R_c$ are the respective hot and cold resistances of the coil; $T_h$ and $T_c$ are the respective hot and cold temperatures of the coil; and $\alpha$ is the coefficient of thermal resistance of copper, that is, $0.00218/°$ F. A preproduction cold resistance of the coil $R_c$ is determined at $T_c$ by applying minimal power to the coil and calculating $R_c$ as the ratio of an applied voltage to a measured current. The $T_c$, $R_c$ and alpha values are stored, and at selected times during the run mode, the temperature of the coil $T_h$ is measured with the sensor 139, and the above formula is used with the stored values to calculate the resistance of the coil $R_h$.

Figure 2B:
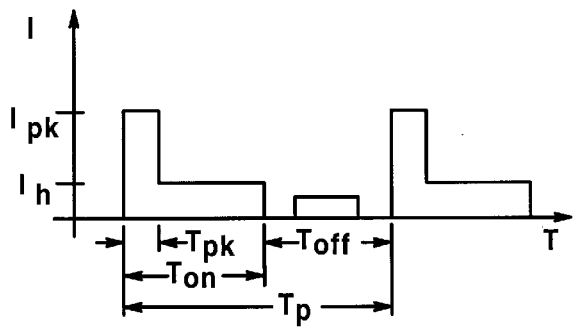
Figure 2C:
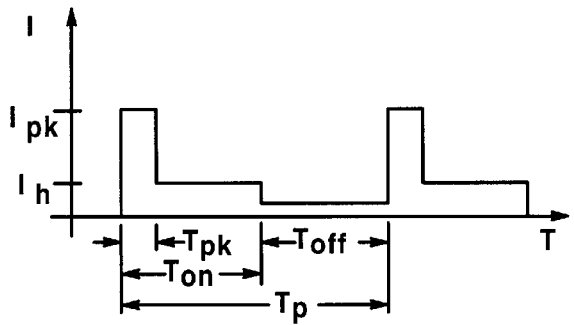

In a further alternative, the resistance of the coil can be measured in real time by other methods. For example, referring to FIG. 2B, during the off-time $T_{off}$ of the current waveform, the control circuit provides a sample current pulse to the coil 70; and the coil current and voltage are measured in a known manner. The resistance value of the coil can then be computed from the samples of voltage and current in accordance with Ohm's Law. FIG. 2C illustrates another method in which during the off-time $T_{off}$ of the current waveform, a small, non-zero, substantially constant magnitude current waveform is applied to the coil 70. In a similar manner, the coil current and voltage are measured and used to compute the resistance of the coil 70. The magnitude of the small, nonzero current of FIGS. 2B and 2C is less than the magnitude of the hold current, so that the even though the coil is electrically turned-on, the spring force maintains the coil 70 mechanically turned-off.

Figure 2D:
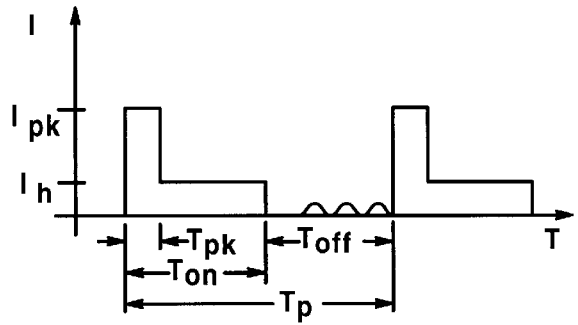

Coil resistance can be measured using a still further alternative illustrated in FIG. 2D in which a sine wave is applied to the coil 70 during the off-time $T_{off}$ of the current waveform. The sine wave has a peak-to-peak value that is less than the magnitude of the hold current, so that the coil 70 is electrically on but mechanically off. Further, the sine wave normally has a frequency of approximately 67 Hertz, but as will be appreciated, other frequencies may be used. The coil 70 is a combination of an inductance and a resistance. With a pure inductance the voltage waveform leads the current waveform by 90°. However, the resistance component of the coil 70 will proportionally reduce the amount by which the voltage waveform leads the current waveform. That lead time can be determined by detecting a zero crossing of the voltage waveform on output 123 of the power switches 154 (FIG. 3) that is applied to the coil 70. That zero crossing is used to start a timer or counter (not shown) in the thermal controller 126; and thereafter, the next zero crossing of the current waveform as detected on the output 129 of the current sensor 128 is used to stop the counter. That measured time shift can be used in conjunction with a table correlating time shift to coil resistance values to determine a current resistance of the coil 70. The table of time shift versus coil resistance values is created experimentally. In a preproduction test using the coil 70, the resistance and temperature of the coil 70 can be measured with instrumentation in response to operating the coil at different power levels and hence at different temperatures. The time shift can be measured and recorded in the manner described above, and a table of time shift versus coil resistance and temperature created and stored.

Figure 5:
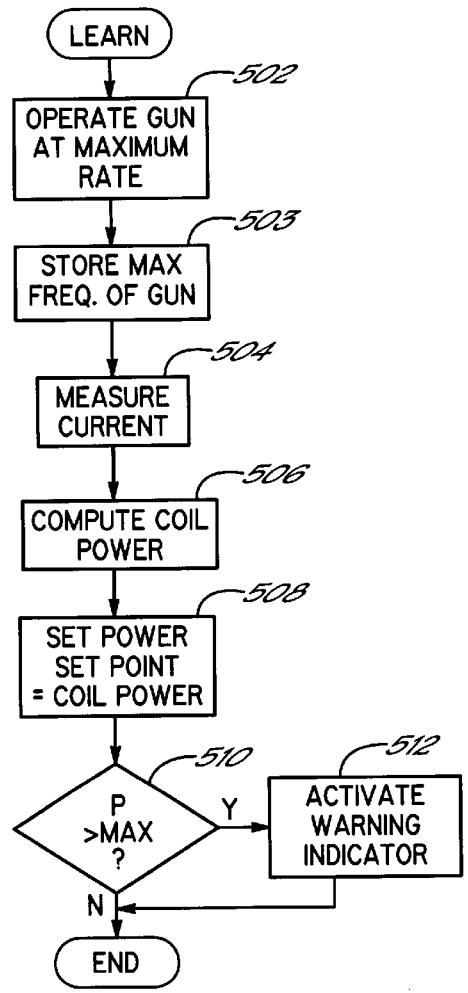
FIG. 5 is a flow chart illustrating process steps associated with the learn mode of the gun controller.

After the coil power at the maximum dispensing rate is computed, the learning process, at 508 of FIG. 5, then causes the control 137 to set the power setpoint or target equal to the computed coil power value. Thus, the maximum dispensing rate is going to produce a desired maximum temperature of the coil 70, and the power or target setpoint is correlated to and representative of that maximum temperature. Consequently, maintaining the power in the coil equal to the power setpoint will result in the coil 70 being maintained at a constant temperature equal to the desired maximum temperature. The learning process further, at 510, determines whether the power setpoint is greater than a predetermined and stored maximum value; and if so, at 512, a warning indicator 132 is activated.

After the power setpoint has been determined in the learn mode, the gun controller 120 is ready to begin operation in one of two operational modes, that is, a run mode or a standby mode. One of those modes is normally selected by a signal on output line 140 from system control 130 in response to a user input or selection. In the run mode, the thermal controller 126 causes the switching device 114 to connect the coil winding 112 to contacts A, thereby connecting the contact windings 110, 112 in series. In this connection, the flux generated by the current flowing through the coil windings 110, 112 is in the same direction and effective to operate the armature 60 of the dispensing valve 33. When in the standby mode, the switching device 114 switches the connections of the coil winding 112 to the B contacts, thereby placing the coil windings 110, 112 in opposition. The flux generated by current flow through the coil windings 110, 112 is in opposition and in a canceling relationship. Thus, with little or no net flux, the current through the coil windings 110, 112 is incapable of moving the armature of the viscous fluid dispenser 10.

Assuming the dispenser 10 is operating in the run mode, a measured current signal from the current sensor 128 is provided to the A/D converter 136 of the thermal controller 126. In a manner as previously described, the value of the current is used with the coil resistance to determine a power value in the current-to-power converter 138. That power value is then compared or algebraically summed in a comparator or summing junction 141 with the power setpoint determined during the learn mode. The difference between the currently measured power value from the converter 138 and the power setpoint is provided as an error signal on output 142 from the comparator 141. If the measured power is greater than the power setpoint, a warning indicator 132 may be activated indicating to the user that the selected current waveform parameters are producing a coil temperature in excess of the selected maximum coil temperature. Thus, the user can then modify the current waveform parameters until the warning indicator is deactivated, thereby assuring the user that the current waveform is producing a coil temperature less than the maximum temperature.

The error signal on output 142 is input to a feedback controller 144 which is normally implemented using a proportional-integral-derivative ("PID") in a known manner. However, as will be appreciated, other control schemes may be used. An output signal from the feedback controller 144 is provided to a power-to-current converter 146. The power value is converted to a current value utilizing known relationships as described with respect to the operation of the current-to-power converter 138. In other words, given a power value from the feedback controller 144 and a coil resistance value, a current value is readily determined.

That current value is then supplied to a waveform generator 148 which, in turn, is initiated by a trigger pulse on output 131 of the system control 130. The trigger pulse defines the point in time at which the current waveform is to be supplied to the coil 70, thereby opening the dispensing valve 33. The trigger pulses are normally produced within the system control 130 by a known pattern controller or programmable limit switch (not shown). The pattern controller stores a matrix of values that represent the operation of various dispensing guns to provide the desired dispensing operation. The generation of a trigger pulse to initiate the operation of a dispensing gun 10 is determined by a relative position of a detectable feature or portion of the substrate 19 with respect to the dispensing gun 10. That relative position can be determined and tracked by utilizing the pattern controller or programmable limit switch in a known manner. Thus, in response to each trigger pulse, the waveform generator 148 provides an output to control the operation of a D/A converter 149 in such a manner as to provide the stepped waveform illustrated in FIG. 2.

In producing the stepped waveforms of FIGS. 2A–2D, the waveform generator 148 normally chooses values of $I_{pk}$ and $T_{pk}$ as a function of the viscosity of the fluid being dispensed. In some applications, it may be appropriate to assume that the viscosity of the fluid remains constant; and therefore, the values of $I_{pk}$ and $T_{pk}$ may be chosen and remain fixed throughout the dispensing cycle. In other control systems, it is known to provide signals representing changes in viscosity. A table of $I_{pk}$ and $T_{pk}$ values associated with different viscosity values may be established and the appropriate $I_{pk}$ and $T_{pk}$ values chosen as a function of a currently determined viscosity value. The dispensing on-time $T_{on}$ varies as a function of the operating speed of the dispensing system within which the dispensing gun 10 operates. Further, the value of the hold current $I_h$ is nominally set to a value equal to the minimum current required to hold the valve in the open position, that is, the minimum value of current to overcome the biasing force of the compressed spring 82 (FIG. 1).

If the dispensing system is operating at its maximum rate, the current being detected by the current sensor 128 results in a power value that is substantially equal to the power setpoint; and hence, there is a zero difference signal on the output 142 from the summing junction 141. Therefore, in that situation, theoretically no modification of the current waveform driving the coil 70 is required. However, as will be appreciated, the dispensing system may often be operated at a rate that is less than the maximum operating rate. In those situations, the current measured by the current sensor 128 will result in a power value from the converter 138 that is less than the power setpoint. If the coil is operated at that lesser current value, the temperature of the coil will drop from the temperature it had achieved during operation at maximum rate. That lesser temperature changes the resistance of the coil 70 and further results in a decrease in the temperature of the coil. The disadvantages of such temperature variations have previously been discussed. Therefore, in accordance with the principles of the present invention, if the RMS current value provided to the summing junction 141 decreases, it is desirable to subsequently increase the RMS current value being supplied to the coil 70 so that the power being consumed by the coil 70 remains substantially constant and equal to the power setpoint. Thus, the current waveform functions to provide a drive current to the coil 70 (FIG. 1) that first, moves the valve stem 28 to open the dispensing valve 33 and dispense the viscous fluid and second, simultaneously varies current in the coil 70 to maintain a substantially constant temperature.

The analog current value on the output 151 of the D/A converter 149 is provided to a coil current modulator 124 (FIG. 3). The modulator 124 includes a comparator or summing junction 150 having inputs responsive to the output 151 of the D/A converter 149 and the output 129 of the current sensor 128. The summing junction 150 provides an output 152 that is an error signal representing the difference between those two current values. That error signal is used to provide a pulse width modulation of the power switches 154 in a known manner. The power switches 154 operate to provide a desired drive current signal to the coil 70 but with a current waveform having a general shape corresponding to the shape determined by the waveform generator 148. The coil switches are normally semiconductor switches such as, for example, MOSFET switches or bipolar transistors which can be configured in known H-bridge or other switching circuit.

If the dispensing system is operating at less than its maximum rate, heat may be added to the coil 70 in one of several different ways. First, the waveform generator 148 increases the value of the hold current $I_h$ in response to an output from the feedback controller 144. As the hold current increases, the current sensor 128 will detect an increase in the current value which, in turn, will increase the value from the power converter 138. That process is iterated until the power value from the power converter 138 is equal to the power setpoint and the error signal on the output 142 of the summing junction 141 has an approximately zero value. Alternatively, the waveform generator 148 can increase the time width $T_{pk}$ of the peak current $I_{pk}$. As a third alternative, the waveform generator 148 can also increase the magnitude of the peak current $I_{pk}$ in response to an error signal on the output 142 of the summing junction 141. The extent to which the peak current can be varied is a function of the current required to saturate the magnetic circuit. As will be appreciated, the waveform generator 148 can modify one or more of the above variables in a desired pattern to control the current being supplied to the coil 70.

Thus, in accordance with the above, the gun controller 120 is effective to maintain the power and hence, the temperature, of the coil 70 substantially constant, independent of the operating frequency of the dispensing gun 10 during the run mode. Thus, the current waveform functions to provide an appropriate drive current to the coil 70 (FIG. 1) that first, moves the valve stem 28 to open the dispensing valve 33 and dispense the viscous fluid and second, simultaneously varies current in the coil 70 to maintain a substantially constant temperature. Therefore, the gun controller 120 of FIG. 3 not only provides the proper current waveform to actuate the fluid dispensing gun, but it introduces heat into the coil in a controlled manner to reduce the range of temperature variations that would otherwise be experienced by the fluid dispenser.

At a subsequent time, the user will switch the system from the run mode into the standby mode. The state of the signal on output 140 of the system control changes, which causes the thermal controller to change the state of operation of the switching solenoid 118, thereby switching the contacts 116 to the B contacts and placing the coils in opposition. Simultaneously, the coil current modulator switches the power switches 154 on at a predetermined magnitude for the duration of the standby mode, thereby supplying continuous current flow the coil windings 110, 112. The predetermined magnitude of the current is normally determined by the average value of current supplied to the coil during the run mode. Therefore, during the standby mode, current is supplied to the coil 70 in a manner as previously described with respect to the run mode. The opposing relationship of the coil windings 110, 112 prevents the armature from being moved, and the dispensing valve remains closed. However, the power being supplied to the coil remains equal to the power setpoint, and the temperature of the coil in the standby mode remains substantially constant. As will be appreciated, instead of applying a constant current magnitude during the standby mode, alternatively, the pattern controller within the system control 130 provides output of trigger pulses at a frequency that is equal to the maximum frequency of the trigger pules that was stored during the learn mode, thereby supplying continuous current flow the coil windings 110, 112.

Figure 6:
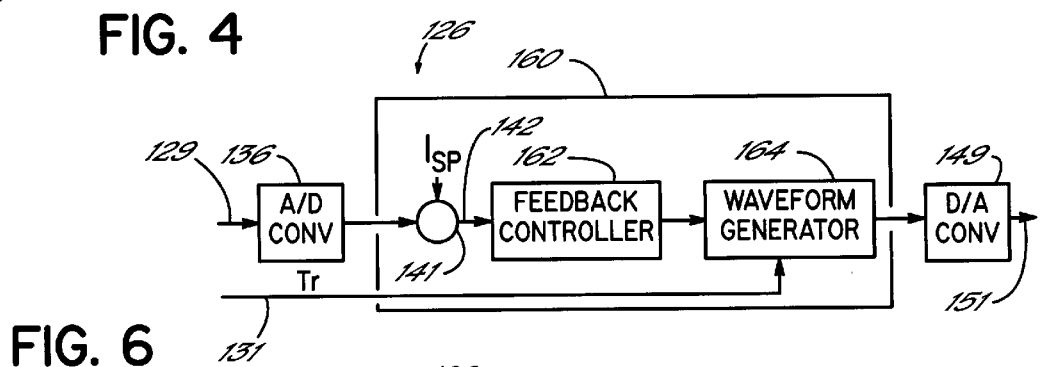
FIG. 6 is a schematic block diagram of another embodiment of the thermal controller of FIG. 3 utilizing a current setpoint.

An alternative embodiment of the microprocessor control 137 is illustrated in FIG. 6. As will be appreciated, the power control 137 of FIG. 4 requires two current/power conversions in the converters 138, 146. Those current/power conversions must be performed in real time and utilize valuable processor time. The devices within the current control 160 of FIG. 6 utilize only current, thereby eliminating the requirement for the converters 138, 146. In a manner similar to that previously discussed, during the learning mode, the current control 160 is implemented with a microprocessor controller and stores a current setpoint value $I_{sp}$ measured by the current sensor 128 when the dispensing system is operating at its maximum rate. Thus, the maximum dispensing rate is going to produce a desired maximum temperature of the coil 70, and maintaining the current in the coil equal to the current setpoint will result in the coil 70 being maintained at a constant temperature equal to the desired maximum temperature. Thereafter, during the run and standby modes, the A/D converter 136 provides a digital signal to the comparator or summing junction 141 which algebraically adds or compares the measured current value during the run and standby modes with the current setpoint. If the measured current value is greater than the current setpoint, a warning indicator or other diagnostic can be activated. The difference between those current values is provided as an error signal on the output 142 of the summing junction 141. A feedback controller 162 utilizes a control loop such as a PID control to provide a signal to the waveform generator 164. The waveform generator 164 operates in a manner as previously described to modify the hold current, spike duration or peak current either individually or in combination to provide a drive signal to the D/A converter 149. The D/A converter 149 provides a signal on the output 151 to the current modulator 124 such that the current provided to the coil 70 is maintained at the setpoint value. Thus, the temperature of the coil 70 is maintained constant, and the coil temperature does not contribute to changes in viscosity of the fluid being dispensed.

Figure 7A:
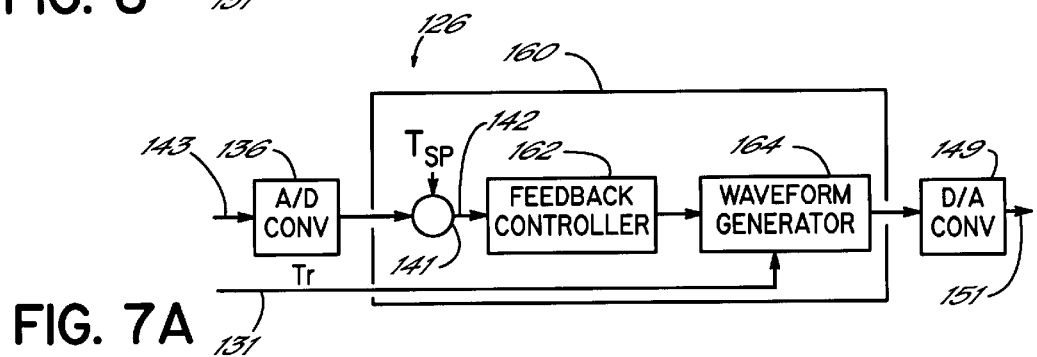
FIGS. 7A and 7B are schematic block diagrams of further alternative embodiments of the thermal controller of FIG. 3 that utilize a temperature control loop.

A still further embodiment of the thermal controller 126 is illustrated in FIG. 7A which uses a temperature control loop as opposed to a current control loop. A temperature setpoint $T_{sp}$ is generally a function of the coil insulation system and may, for example, be 425° F. The temperature setpoint can selected by the user using input devices associated with the system control 130. Alternatively, the temperature setpoint can be automatically established in the learn mode by reading the value of the temperature sensor 139 when the dispensing system is operating at its maximum rate. The temperature sensor 139 can be implemented with any known temperature sensing device, for example, a resistance temperature device, a thermocouple, a thermistor, a solid state sensor, etc.

Thereafter, during the run and standby modes, a measured temperature signal is provided as an input to the summing junction 142. The summing junction 141 algebraically adds or compares the measured temperature value during the run and standby modes with the temperature setpoint. If the measured temperature value is greater than the current setpoint, a warning indicator or other diagnostic can be activated. The difference between those temperature values is provided as an error signal on the output 142 of the summing junction 141. The feedback controller 162 and waveform generator 164 operate in a manner as previously described to modify the hold current, spike duration or peak current either individually or in combination to provide a drive control signal to the D/A converter 149. The D/A converter 149 provides a comparable analog signal on output 151 to the current modulator 124 such that the current provided to the coil 70 is regulated to maintain the temperature of the coil 70 at the temperature setpoint value. Thus, the constant coil temperature maintains a constant viscosity of the fluid being dispensed.

Figure 7B:
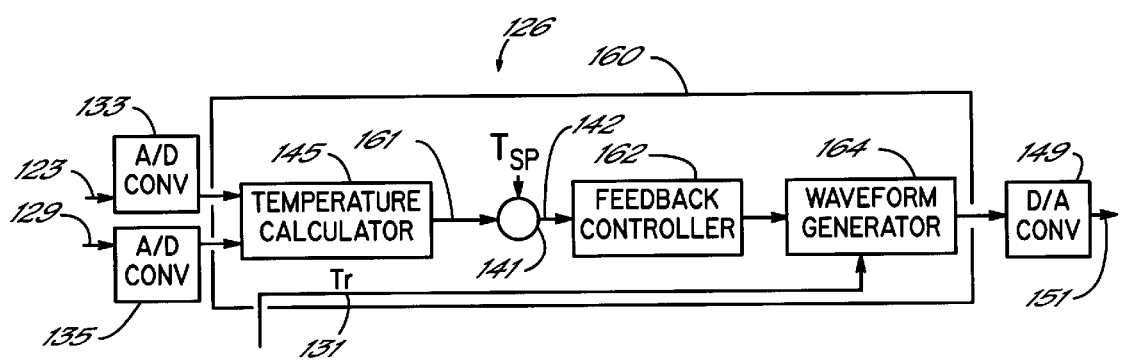

Another embodiment of the thermal controller 126 having a temperature control loop is illustrated in FIG. 7B. An A/D converter 133 has an input connected to an output 123 of the power switches 154; and an A/D converter 135 has an input connected to an output 129 of the current sensor 128. A temperature calculator 145 is responsive to the voltage and current signals from the respective A/D converters 133, 135 to provide on its output 161 a signal representing a current, measured temperature of the coil 70. This embodiment can be used to determine the temperature setpoint $T_{SP}$ using either of the alternative off-time current waveforms illustrated in FIGS. 2B–2C. In a learn mode, with the dispensing system operating at its maximum rate, after the temperature calculator 145 samples the voltage and current signals from the A/D converters 133,135, the resistance of the coil can be computed in accordance with Ohm's Law. The maximum temperature or temperature setpoint is then read from a table correlating coil resistance to coil temperature that had been previously determined by experimentation as previously described.

The maximum temperature or temperature setpoint can alternatively be determined using the off-time waveform as previously described using the sinusoidal waveform of FIG. 2D. It should be noted that the initiation of the sinusoidal waveform of FIG. 2D is delayed for a short period of time after the end of the on-time. That delay provides time for any currents induced by the collapsing electromagnetic field to dissipate. During the application of the sinusoidal waveform, the temperature calculator 145 detects a zero crossing of the voltage waveform on output 123 of the power switches 154 (FIG. 1) that is applied to the coil 70. That zero crossing is used to start a timer or counter (not shown) in the temperature calculator 145; and thereafter, the temperature calculator 145 detects the next zero crossing of the current waveform as detected on the output 129 of the current sensor 128. That zero crossing of the current waveform is used to stop the counter; and therefore, the value measured by the counter in the temperature calculator 145 represents a measured time shift between the voltage and current signals that are applied to the coil 70. The temperature calculator 145 uses that measured time shift in conjunction with a table correlating time shift to temperature that was created as previously described, and the temperature calculator 145 provides on its output 161 a signal representing the current temperature of the coil 70.

When the dispenser is operating in the run mode, the embodiment of FIG. 7B can utilize any of the current waveforms illustrated in FIGS. 2B–2D to continuously provide a measured temperature signal on the output 161 of the temperature calculator 145. That measured temperature signal to provided to the comparator 141 to produce an error signal therefrom and modify the current waveform as described with respect to FIG. 7A to maintain the temperature of the coil 70 at the desired temperature setpoint value.

Figure 8:
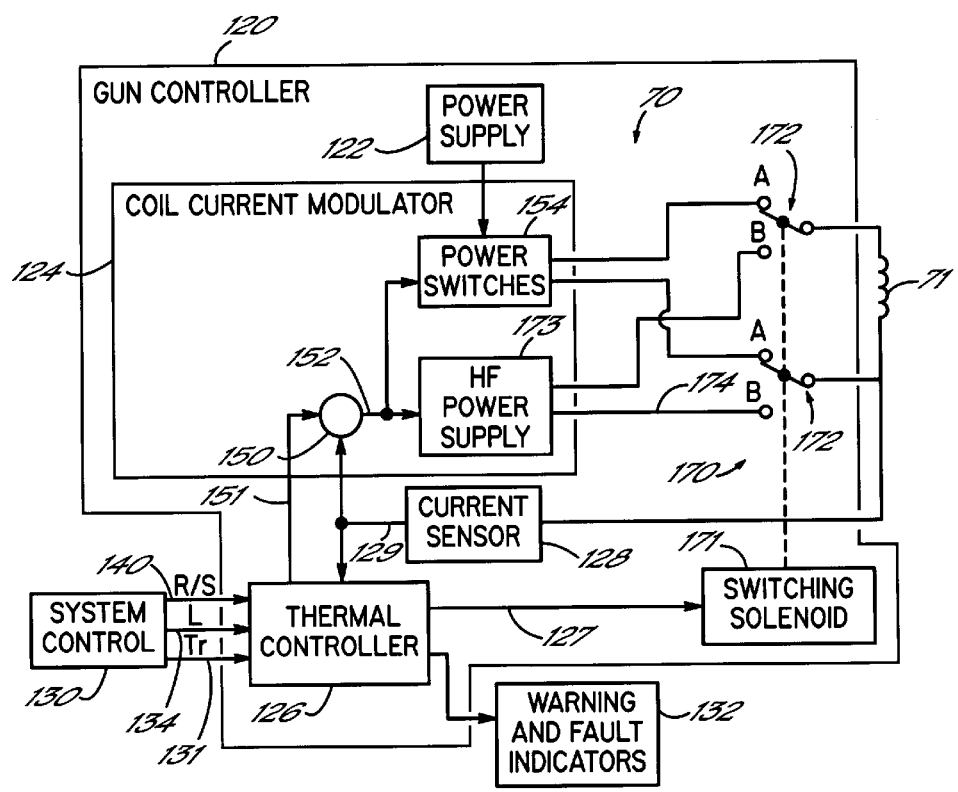
FIG. 8 is a schematic block diagram illustrating a second embodiment of a gun controller for controlling the temperature of the dispensing valve coil in accordance with the principles of the present invention.

Referring to FIG. 8, an alternative embodiment of the invention for maintaining a constant coil temperature is illustrated. In this embodiment, a standard coil 71 is utilized and is connected to the current sensor 128. A switching device 170, for example, a switching relay, has a switching solenoid 171 connected to switching contacts 172. As previously described with respect to FIG. 3, the thermal controller 126 provides a run/standby signal on an output 127 as it is received from the system control 130. The run/standby signal is provided to the switching solenoid 171 over the output 127 of the thermal controller 126. In the run mode, the switching solenoid 171 moves the switching contacts 172 to the illustrated A position, thereby connecting the coil 71 to the power switches 154. In the run mode, the gun controller 120 operates in a manner substantially identical to that described with respect to FIGS. 3–6. A drive current signal is provided to the coil 71 that is derived from a current, power or temperature setpoint, whichever is used.

When the thermal controller 126 detects that the operating mode has been switched to the standby mode, the state of the signal on the output 127 is changed, thereby causing the switching solenoid 177 to switch the contacts 172 to the B contacts. In this position, the coil 71 is connected to a high frequency power supply 173. The output frequency of the high frequency power supply 173 is chosen to have a frequency value higher than the response time of the coil, that is, sufficiently high that the coil 71 is incapable of moving the armature 60. If the high frequency signal swings equally above and below an average value, the gun acts like a low pass filter. If the average value is zero, the gun will not be actuated. Further, the frequency chosen should not permit the coil 71 to dither the armature 60 and dispensing valve 33 to such an extent that the dithering action generates heat at the end of the dispensing gun 10 or permits minute quantities of fluid to pass through the dispensing valve 33. Therefore, such a frequency may be 10 KHz or less or as high as 1 MHz or more; but normally, the frequency is around 100 KHz.

In a manner similar to that previously described with respect to power switches 174, the high frequency power supply 173 is responsive to the output 152 of summing junction 150 in order to vary the magnitude of the high frequency signal applied on the output 174 of the power supply 173. The net result is that the average or RMS current as detected by the current sensor 128 and thermal controller 126 is maintained equal to the respective current, power or temperature setpoint during the standby mode of operation, thereby maintaining the temperature of the coil 71 constant and hence, a more constant viscosity within the dispensing gun 10.

Figure 9:
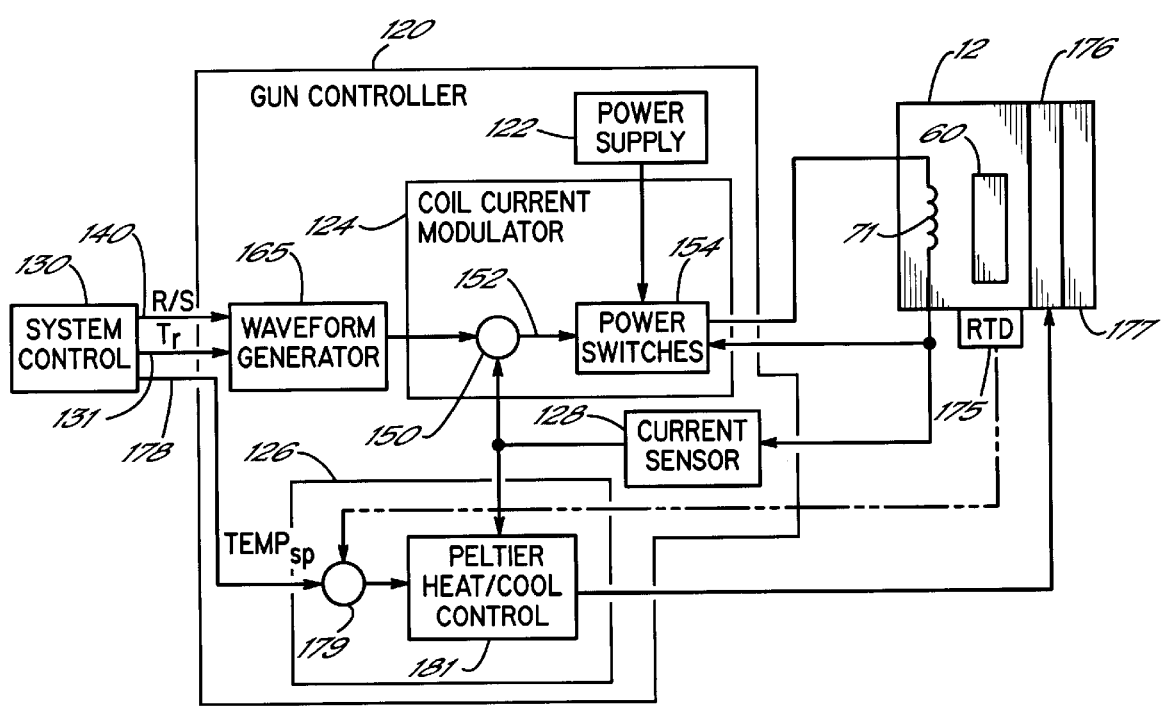
FIG. 9 is a schematic block diagram of a further embodiment of a gun controller for controlling the temperature of the dispensing valve in accordance with the principles of the present invention.

Referring to FIG. 9, a further embodiment of the apparatus for controlling the temperature of the coil 71 is illustrated. The coil 71 is mounted adjacent an armature 60 within a dispensing body 12. One or more Peltier elements 176 are mounted on the exterior of the dispensing body 12. A heat sink 177 is mounted over the Peltier element 176. A Peltier element is a two-terminal bidirectional device capable of heating or cooling by reversing the direction of current flow through the Peltier element. Peltier elements are commercially available from Melcor of Trenton, N.J.

In one mode of operation, the gun controller 120 receives a run/standby signal from the system control 130 and a waveform generator 165 creates a waveform similar to that described with respect to FIG. 2A. The variables associated with the waveform are determined in a traditional manner in that the peak current magnitude $I_{pk}$ and peak current duration $T_{pk}$ are determined as a function of the viscosity of the fluid being dispensed. Further, the hold current $I_h$ is determined to be the minimum current required to hold the dispensing valve 33 open. That waveform is provided to the coil current modulator 124 and a drive current signal is provided to the coil 71 in accordance with the output from the waveform generator 165 and the feedback from the current sensor 128 in a manner similar to that previously described. In this embodiment, a temperature setpoint $T_{sp}$ is provided to a summing junction 179. The temperature setpoint may either be permanently stored within the gun controller 120 or provided in any of the ways previously described with respect to FIG. 7B including utilizing the current waveforms of FIGS. 2B–2D. The summing junction 179 compares the temperature setpoint with a temperature feedback signal and provides a signal representing the difference between the inputs to a Peltier heat/cool control 181. The temperature feedback signal is provided in any one of several ways. For example, the temperature feedback signal may be a temperature sensing device 175, shown in phantom, that is mounted in a heat transfer relationship with the coil 71. The temperature sensing device 175 can be any of several known devices may be used, for example, a temperature resistance device, thermal couple or other known temperature sensing device. Further, as will be appreciated, instead of using a separate temperature sensing device 175, the Peltier element 176 can be used to sense the temperature. The heating/cooling cycles of the Peltier element 176 can be interrupted for short periods of time during which the Peltier element 176 provides an output voltage proportional to temperature. Alternatively, the temperature feedback signal may be provided by using any of the current waveforms of FIGS. 2B–2D as previously described. The Peltier control is a known heating control and may be implemented using proportional, proportional integral or PID control to operate the Peltier element 176.

The temperature setpoint represents an expected temperature of the coil 71 when the system is operating at a maximum rate. The Peltier heat/cool control 181 is operative to cause the Peltier element 176 to selectively heat or cool the dispenser body 12 in response to the temperature sensing device 175 detecting a temperature that is respectively less than or greater than the temperature setpoint. Thus, for example, if the system is operating at maximum rate in an environment that does not permit proper cooling of the dispenser body 12, the dispenser body may reach a temperature in excess of the desired temperature setpoint. In that situation, the Peltier heat/cool control 181 causes the Peltier element 176 to cool the dispenser body 12 to the temperature setpoint. Alternatively, if the gun controller is switched from the run mode to the standby mode in which no current is being supplied to the coil 71, the dispenser body cools to a temperature less than the temperature setpoint. That cooler temperature, as detected by the temperature sensor 175, causes the Peltier heat/cool control 181 to operate the Peltier element 176 to heat the dispenser body back to the temperature setpoint.

The use of the Peltier element 176 has the further advantage of permitting the coil to be operated in a power range, that is, at a rate, that exceeds its specified rate. For example, if the coil 71 is specified to operate at a rate that is equivalent to nine watts of power being applied to the coil and the Peltier element is capable of cooling three watts of power from the coil, the coil current modulator 124 may be used to drive the coil at a rate that is equivalent to twelve watts of power, thereby substantially increasing the frequency of operation of the dispensing valve 33. Even though the coil is being supplied with twelve watts of power, the Peltier element is able to remove three watts of heat, thereby maintaining the net power heat of the coil 71 at nine watts and within its specifications.

While the Peltier heat/cool control 181 is illustrated in FIG. 9 as being part of a closed temperature control loop utilizing the temperature sensor 175, as will be appreciated, the temperature sensor 175 may be eliminated and the Peltier heat/cool control operated in an open loop mode responsive only to the temperature setpoint. The temperature control of FIG. 9 has further versatility in that, as will be appreciated, the temperature setpoint may be fixed, user selectable to accommodate different sizes of coils, a constant value over time or even a value that varies as a function of some other parameter.

The above embodiments of a coil temperature control for maintaining the constant coil temperature have many advantages. First, the gun controller does not rely on the user being able to select the best current waveform parameters, but instead, is adaptive and self-adjusting to maintain a constant coil temperature. With a constant coil temperature, the viscosity of the fluid within the dispensing gun is held more consistent, thereby improving the consistency of the dispensing process. Further, by maintaining the constant temperature over the full range of operating frequency of the dispensing gun, the quality of the fluid dispensing operation is further enhanced and more consistent. Further, such a temperature control permits the dispensing gun to be consistently operated at a rate that is very close to, if not at, the theoretical maximum temperature limit of the gun without overheating. The active temperature control protects the coil from overheating in the event that the user adjusts the current waveform such that an excessive temperature would otherwise be produced.

Further, by activating an overheat indicator when the measured feedback current or temperature exceeds the setpoint value, valuable feedback is provided to the user with respect to the adverse effect of the selected current waveform parameters, thereby allowing the user to take appropriate action.

Utilizing the dispensing valve coil to add heat to the module provides an opportunity for a new and different design of a dispensing gun. Referring to FIG. 1, the dispensing gun includes one or more valve dispensing modules 33 mounted onto a manifold 45. Normally, the manifold 45 includes a heater and temperature feedback device (not shown) for maintaining the viscous fluid at a desired temperature. In the past, the circulation of the heated fluid through the manifold 45 and dispensing valve 33 proved to be an adequate thermal management strategy. However, as discussed earlier herein, the heat of the coil of the electric gun introduces a new and significant thermal management issue. In accordance with the principles of the present invention, by controlling the heating of the coil, the temperature of the dispensing module or valve is controlled. Thus, for the first time, the thermal management of the dispensing module is self contained within the module and independent of other elements, for example, the manifold plate 45. This new module capability provides new opportunities for a different construction of the dispensing gun.

Figure 10:
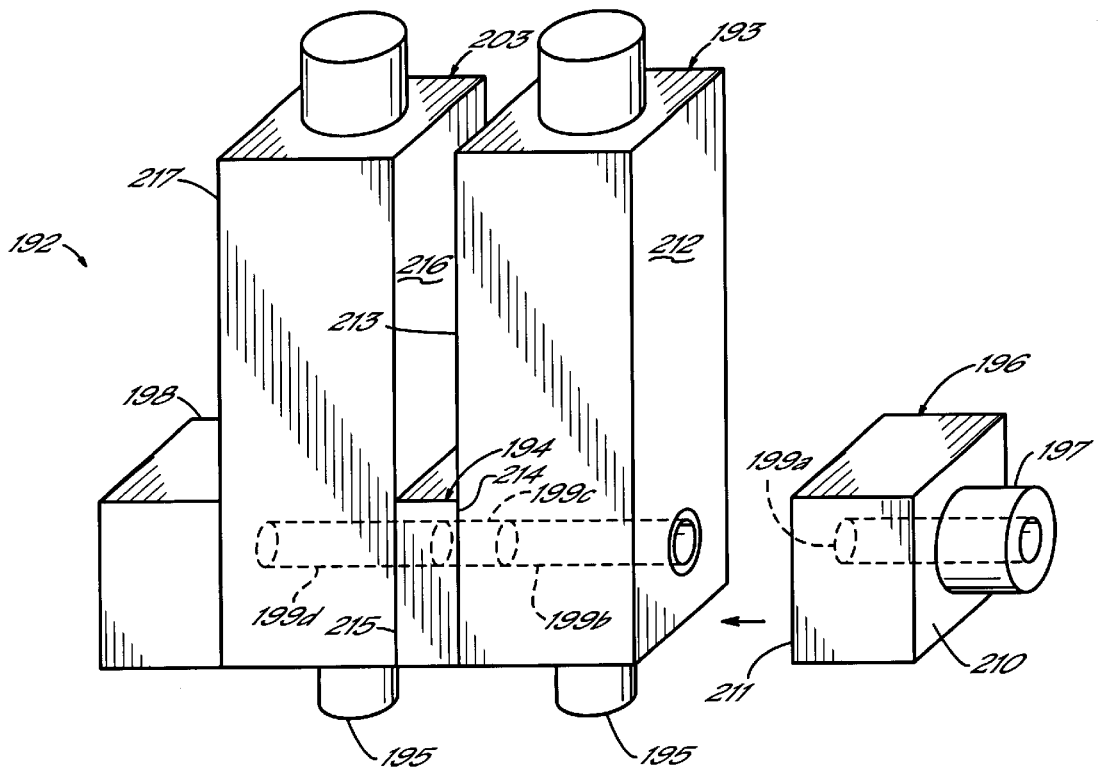
FIG. 10 is a partially disassembled view of a dispensing gun utilizing the coil heating capabilities of the present invention.

Referring to FIG. 10, a dispensing gun 192 is constructed by serially connecting dispensing valves or modules 193, 203 without requiring a fluid distribution manifold 45 (FIG. 1) as is required in known fluid dispenser constructions. The modules 193, 203 are mounted immediately adjacent each other or are separated by a spacer plate 194 to provide the desired spacing between the nozzles 195 of the modules 193, 203. In the design of FIG. 1, the desired spacing of the modules 33 is achieved by mounting the modules 33 at the desired spacing on the manifold plate 45.

A second distinction from known fluid dispensers is that the viscous fluid is fed serially through the dispensing modules 193, 203 from one end of the dispensing gun 192. In contrast, in FIG. 1, each dispensing module 33 is fed directly from the manifold plate 45 by a dedicated feed passage 49 within the manifold plate 45. The dispensing gun 192 of FIG. 10 receives the viscous fluid from a feed member or end plate 196 coupled to one end of the dispensing gun. The feed member 196 has a fluid inlet 197 intersecting one side 210 of the member 196, and the fluid inlet is fluidly connected to a source of pressurized viscous fluid 47 (FIG. 1). The fluid inlet 197 is fluidly connected to a first fluid passage portion 199a that intersects an opposite side 211 of the feed member 196. The opposite end of the dispensing gun 192 is terminated with a cap or end plate 198, the sole function of which is to terminate the continuous fluid passage 199 extending from the inlet 197, through the feed member 196, the dispensing valve 193, spacer plate 194 and the dispensing valve 203. A second fluid passage portion 199b within the dispensing module 193 intersects two sides, for example, opposite sides 212, 213 of the dispensing module 193. A third fluid passage portion 199c intersects two sides, for example, opposite sides 214, 215 of the spacer plate 194, and a fourth fluid passage portion 199d intersects two sides, for example, opposite sides 216, 217 of the dispensing module 203. As will be appreciated, the above construction permits the use of only a single dispensing module or any number of dispensing modules. as is required by the application. The spacer block 194 can be of any width desired, or the dispensing modules 193, 203 can be mounted together without an intervening spacer block 194. In addition, the cap 198 may be implemented by a plate or a plug that is threaded into the passage 199d at the side 217. Similarly, the feed member 196 can be implemented with a plate, a nipple or other fitting threaded into the passage 199a at the side 210. Further, the internal fluid passages 199b and 199d can be L-shaped or T-shaped, so that the passages 199b, 199d intersect other sides of the modules 193, 203, thereby providing more flexibility in designing a dispensing gun for a particular application.

By incorporating heaters in the dispensing modules 193, 203 either by using the coil as a heater or, by incorporating other heaters as described with respect to FIG. 7A, the dispensing modules 193, 203 are capable of providing sufficient heat to maintain the viscous fluid within the passage 199 at the desired temperature without requiring a separate manifold. The construction of the dispensing gun 192 has the further advantage of being substantially more compact than the traditional design of FIG. 1. Further, by eliminating the manifold 45 as well as its associated heater and heat control apparatus, the construction of the dispensing gun 192 of FIG. 10 is substantially less expensive; and its simpler construction provides substantially greater flexibility in mounting the dispensing gun 192 with associated equipment.

The embodiments described thus far in FIGS. 2–9 are directed to providing an automatic control of coil temperature to reduce the adverse effects of varying coil temperature during the fluid dispensing process. As will be appreciated, in any application, providing the user with data or indicators relating to an excessive temperature and a potentially excessive temperature is also valuable. In many dispensing systems, the user has the ability to manually adjust the peak current magnitude $I_{pk}$, the peak current duration $T_{pk}$ and the magnitude of the hold current $I_h$. Further, the dispensing process involves many variables that are application dependent such as the dispensing pattern, the liquid viscosity, the production rate, the substrate material, etc. In an effort to optimize the dispensing process, the user often changes the shape of the current waveform being provided to the coil. Further, the user has no knowledge of when such adjustments come close to or exceed the power specification or maximum temperature limit for the coil. Further, typical users generally do not have instruments, such as an oscilloscope or current probe, that would permit them to monitor the current being supplied to the coil. Thus, a system that provides the user with an indication of whether a chosen current waveform produces an excessive coil temperature would be of significant benefit. Thus, when adjusting the waveform of the current being supplied to the coil, the user would have a real time feedback of whether such adjustments are approaching or exceeding the maximum temperature limit of the coil.

Figure 11:
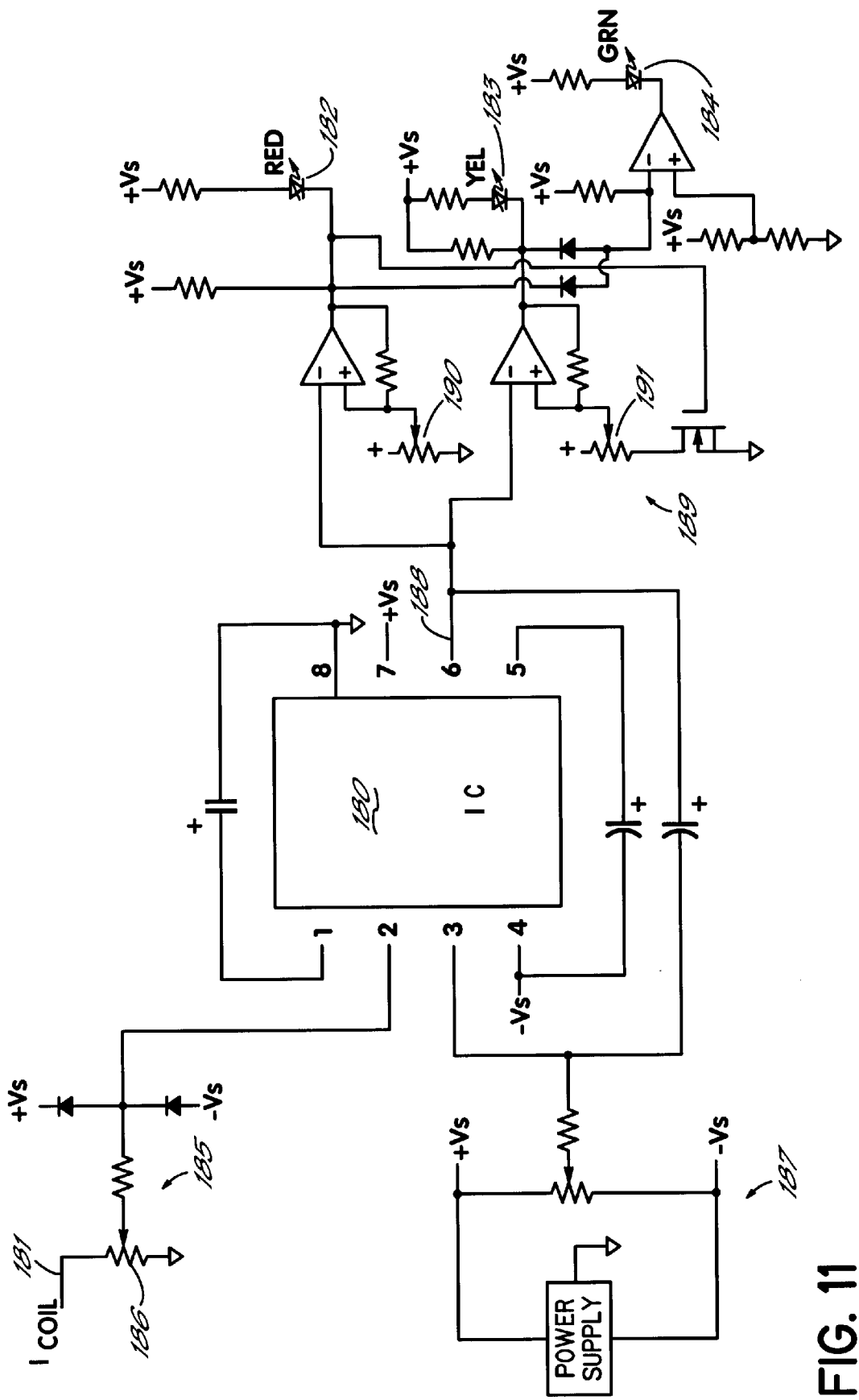
FIG. 11 is a schematic diagram of an embodiment utilizing an integrated circuit chip to detect temperature variations in the dispensing valve coil.

FIG. 11 is one embodiment of such a thermal monitor and diagnostic circuit. A measure of heating power in the coil is best represented by a measurement of the RMS value of the current or voltage applied to the coil. Such RMS values have a direct correspondence to coil heating and provide a reasonable indication of temperature. As previously mentioned, the measurement of an RMS current value and its conversion to a direct current value can be effected either computationally or with a specialized integrated circuit chip. One such integrated circuit chip is Model No. AD736 commercially available from Analog Devices. Other chips such as Model Nos. AD737 and AD637 as well as similar chips from other manufacturers may also be used. Referring to FIG. 11, such an integrated circuit chip 180 is responsive to coil current on an input 181 and provides an output to red, yellow and green LEDs 182, 183, 184, respectively, that provide a qualitative indication of coil temperature. The coil current on the input 181 is provided to the chip 180 via an input circuit 185 that includes a gain adjust potentiometer 186. The chip 180 is powered by a power supply circuit 187, and the chip 180 provides a DC signal on an output 188 that is proportional to the RMS value of the coil current supplied on the input 181. A comparator circuit 189 compares the magnitude of the DC voltage on the output 188 to reference voltages that are selectable via potentiometers 190, 191.

The monitor circuit of FIG. 11 must be set for the temperature characteristics of each different electric fluid dispenser. The temperature characteristics can be determined experimentally by storing a temperature versus power or current relationship for the fluid dispenser. Such a relationship can be determined by applying different magnitudes of current to the dispenser and measuring the resultant temperature. The maximum temperature for the fluid dispenser is normally determined as a function of the manufacturer's specifications for the fluid dispenser. Using the stored current-temperature relationship, a first current value can be determined based on the maximum dispenser temperature. That first current value is applied to the input 181, and the potentiometer 190 is adjusted until the red indicator light 182 turns on.

Similarly, a lesser temperature close to the maximum temperature, for example, a temperature that is 90% or 95% of the maximum temperature, is selected. Using the stored temperature-current relationship, a corresponding current is determined and applied to the input 181 of the monitor circuit. Potentiometer 191 is then adjusted until a yellow caution LED 183 is illuminated. Thus, the yellow caution LED 183 indicates when the current in the coil is representative of a temperature between the lesser temperature and the maximum temperature. If the coil current on the input 181 is below the threshold of the comparator circuit 189 necessary to illuminate the yellow LED 183, the green LED 184 is illuminated, thereby apprising the user that the current waveform being selected by the user is less than the lesser temperature and will not produce an excessive coil temperature. While FIG. 11 illustrates one example of a coil temperature monitor, it should be noted that the embodiments of FIGS. 3–9 all have the capability of providing a coil temperature monitor feature whether separately identified as indicators 132 or integrated in the machine control 130. Further, as shown in FIGS. 2B–2D, current sampling during the off-time of the current waveform can also be used to provide a temperature monitor.

The thermal monitor circuit of FIG. 11 has the advantage of providing the user with a real time indication of whether the user's adjustments to the current waveform provide a coil temperature that is less than, close to or in excess of the maximum coil temperature. Further, the speed of a production line is often increased incrementally as various adjustments are made and the increased speed does not adversely impact quality. As the line speed increases, the average coil current increases; and the monitor circuit of FIG. 11 continuously senses the coil current and warns the user via the LEDs 182, 183 that the coil current is close to or exceeds a value that produces an excessive temperature. In addition, the thermal monitor uses an RMS value of coil current or voltage and therefore, provides an excellent indicator of temperature. In addition, the thermal monitor allows the user to select the temperature limits which are appropriate for the dispensing gun being used and the dispensing application being effected. As will be appreciated, other gradations of temperature may be provided, for example, by a bar graph; and other forms of sensory perceptible indicators, for example, audio indicators, may also be used.

While the present invention has been illustrated by a description of various preferred embodiments and while these embodiments have been described in considerable detail in order to describe the best mode of practicing the invention, it is not the intention of Applicant to restrict or in any way limit the scope of the appended claims to such detail. Additional advantages and modifications within the spirit and scope of the invention will readily appear to those skilled in the art. For example, the run/standby signal is described as being user selectable and provided from the system control 130 to the thermal controller 126. As will be appreciated, the system control 130 can alternatively be used to directly drive the switching solenoid 171 and other components with the run/standby signal instead of the thermal controller 126. Further, other methods of providing a run/standby signal can be readily derived. As will be appreciated, other signals, such as setpoint values, may originate in, or be stored in, the gun controller 120 or the machine control 130 as is appropriate. Further, the gun controller may also include user input and output devices as is appropriate and is generally a matter of design choice.

In the described embodiments with respect to FIGS. 3–9, the respective power, current and temperature setpoints were set to be representative of the temperature of the coil with the system operating at a maximum dispensing rate. Further, warning indicators are activated in response to the measured power, current or temperature exceeding the respective power, current or temperature setpoint. As will be appreciated, the setpoint used in the control loop in the thermal controller 126 may be any temperature. Further, the thermal controller 126 may compare the measured power, current or temperature to several reference values of power, current or temperature to provide other warning indicators. For example, the measured power, current or temperature values may be compared to a respective power, current or temperature setpoint representing a coil temperature at a chosen operating frequency or rate to control the waveform generator as described. In addition, the measured power, current or temperature values may be compared to a respective power, current or temperature reference value representing a maximum coil temperature, and a warning indicator activated when the maximum coil temperature is exceeded.

The learn signal is described as being a user selected input to the system control 130, however, as will be appreciated, the learning processes may be implemented using other methods. For example, the gun controller can, while the system is operating, keep track of the highest trigger frequency and corresponding measured power, current or temperature. Subsequently, the corresponding power, current or temperature is defined as the setpoint value. Alternatively, the learn signal can be avoided altogether by running the coil at the maximum power, current or temperature that the gun can tolerate. In other words, the power, current or temperature setpoint is assumed to be the maximum for the equipment rather than being application or installation specific.

The switching device 114 of FIG. 3 provides a fixed switching of the coil winding 112 with respect to the coil winding 110. Further, the power switches 154 are effective to provide essentially the same drive current to the coil 70 in both the run and the standby modes. Thus, the relationship between the heating power and the actuation force resulting from the current flow through the coil 70 in the run mode is equal to the sum of the currents flowing through the coil windings 110, 112. However, the heating power provided by the current flow through the coil 70 in both the run and standby modes is equal to the sum of the square of the currents flowing through the coil windings 110, 112. In the switching arrangement illustrated in FIG. 3, the coil windings 110, 112 are serially connected by the switching device 114; and therefore, for any given drive current provided by the power switches 154, the actuation force and the heating power will have a fixed relationship. If the coil windings 110, 112 were not serially connected, but were connected in parallel with respect to the power supply 122, then the current flow through the coil winding 110 could be independently controlled and different from the current flow in the coil winding 112.

Figure 12:
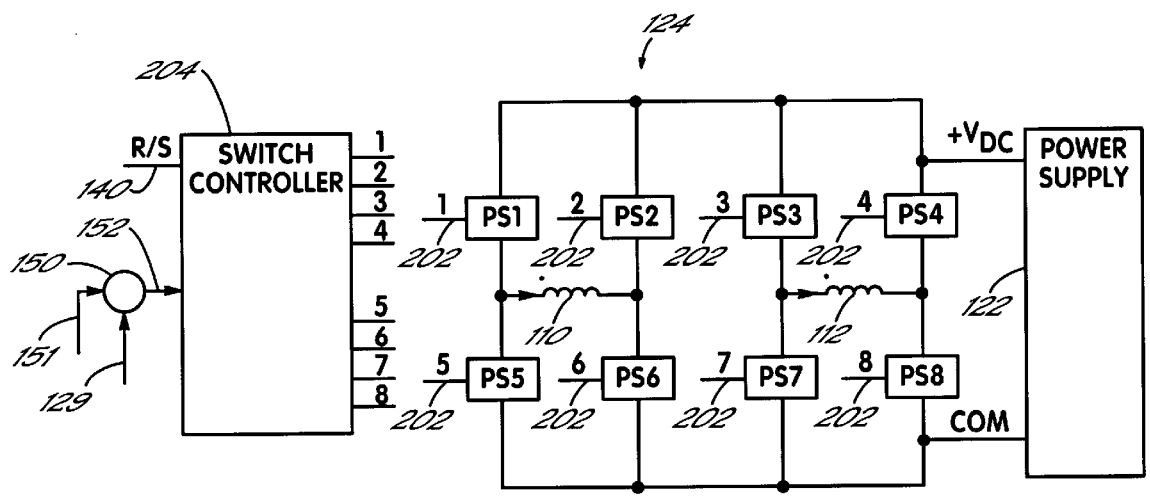
FIG. 12 is a schematic diagram of an alternative embodiment for interconnecting coil windings of a bifilar coil.

Such a switching arrangement is illustrated in FIG. 12 as an alternative embodiment of the coil current modulator 124. Power switches PS1–PS4 connect each end of the coil windings 110, 112 to one side of the power supply $+V_{DC}$. Further, power switches PS5–PS8 connect each end of the coil windings 110, 112 to the power supply common. Each of the power switches PS1–PS8 has a control input 202 connected to respective outputs 1–8 of a switch controller 204. The switch controller is a logic processor that responds to a run/standby signal from output 140 of the system control 130 (FIG. 1) to connect the coil windings 110, 112 in either an additive relationship or in opposition. For example, in the run mode, the switch controller 204 provides outputs to close power switches PS1, PS6, PS3 and PS8, thereby causing current to flow in the coil windings 110, 112 in an additive relationship. When the standby mode is active, the switch controller 204 will provide outputs to open power switches PS3 and PS8 and close power switches PS4 and PS7, thereby reversing the current flow with respect to the coil winding 112 and placing the coil windings 110, 112 in opposition.

The switch controller 204 includes the further capability of varying the duty cycle of the operation of the power switches PS1–PS8 by utilizing, for example, a pulse width modulation process. Therefore, for example, if the power switches PS1 and PS6 are closed 100% of the time, a current flow of 3 amps passes through coil winding 110. However, if, utilizing the pulse width modulation capability of the switch controller 204, the duty cycle of the power switches PS1 and PS6 is reduced to 50%, the current flow through the coil winding 110 is reduced to 1.5 amps. Using that capability, the following are several examples of how the heating power provided by the coil windings 110, 112 can be varied substantially while maintaining a constant actuation force for opening the dispensing valve.

In the first example, assume that during the run mode, the switch controller 204 operates the power switches at a 33% duty cycle. Continuing with the numerical examples of the prior paragraph, a 33% duty cycle results in 1 amp flowing through coil windings 110, 112 in response to power switches PS1, PS6, PS3 and PS8 being closed. The actuation force is determined by the sum of the current flows through the coil windings 110, 112 and is therefore, 2 amps. Further, the power heating capability is equal to the sum of the square of the current flowing through the coil windings 110, 112 and is also 2 amps. The same result is achieved in the standby mode when power switches PS3 and PS8 are opened and power switches PS4 and PS7 are closed.

In a second example, assume that in the run mode, power switches PS1 and PS6 are operated at a 67% duty cycle to provide 2 amps of current flow through coil winding 110, whereas power switches PS3 and PS8 are operated at a zero duty cycle, thereby providing no current flow through coil winding 112. Once again, the actuation force resulting from the sum of the current flows is 2 amps. However, the heating power, which is a result of the sum of the square of the current flows, is equal to 4 amps. In the standby mode, power switches PS1, PS6, PS4 and PS7 are operated at a 47% duty cycle providing a current flow of approximately 1.4 amps through the coil windings 110, 112. Since the coil windings are connected in opposition, the sum of the current flows is zero and the actuation force is likewise zero. However, the sum of the squares of the current flows is approximately 4 amps which is the same as the heating power provided during the run mode.

In a third example, during the run mode, power switches PS1 and PS6 are operated at a 100% duty cycle providing a 3 amp current flow through coil winding 110. In addition, power switches PS4 and PS7 are operated at a 33% duty cycle providing a current flow of 1 amp through coil winding 112. The coil windings 110, 112 are connected in opposition; and therefore, the 1 amp flow through coil winding 112 subtracts from the 3 amp flow through coil winding 110 to provide a net sum of a 2 amp actuating force. However, the power heating capability, being the sum of the squares of the currents, is approximately 10 amps. In the standby mode, the power switches PS1, PS6, PS4 and PS7 are operated at a 75% duty cycle to provide opposing current flows in coil windings 110, 112 of 2.25 amps. The equal opposing current flows sum to a zero current flow and a zero actuation force, however, the sum of the squares of the current flows is approximately 10 amps.

The power switches PS1–PS8 are implemented using commercially available semiconductor switches several types of which have been previously identified herein. The modulation of the operation of the power switches PS1–PS8 to vary their duty cycle occurs at a frequency that is substantially greater, for example, 100 times greater, than the maximum expected frequency of the current waveforms provided on the output 152 of the summing junction 150. As will be appreciated, other configurations of power switches can be implemented, for example, the power switches PS2 and PS5 can be eliminated from the circuit. The power switching circuit of FIG. 12 provides a substantial range of temperature control as well as significant design flexibility and precision in the control of temperature of the gun coil. Further, the ability to manipulate the temperature of the gun coil during the run and standby modes is also substantially more flexible. By uncoupling the heating capability of the coil from the actuation force required to operate the coil, a substantially wider range of heat control is possible.

In the embodiments described with respect to FIGS. 3–9 and 12, temperature control is obtained by maintaining a constant temperature during both the run and standby modes of operation, that is, both, while the dispensing gun is dispensing fluid, and while the dispensing gun is inactive and not dispensing fluid. Maintaining a constant coil temperature during all modes of operation theoretically provides the best results and the least impact on the quality of the dispensing operation, but it comes at a substantial price in terms of additional components and complexity to the dispensing control system. For example, in the described embodiments, such components may include a bifilar coil and associated switching circuits or, alternatively, a high frequency power supply and associated switching circuits, etc.

Figure 13:
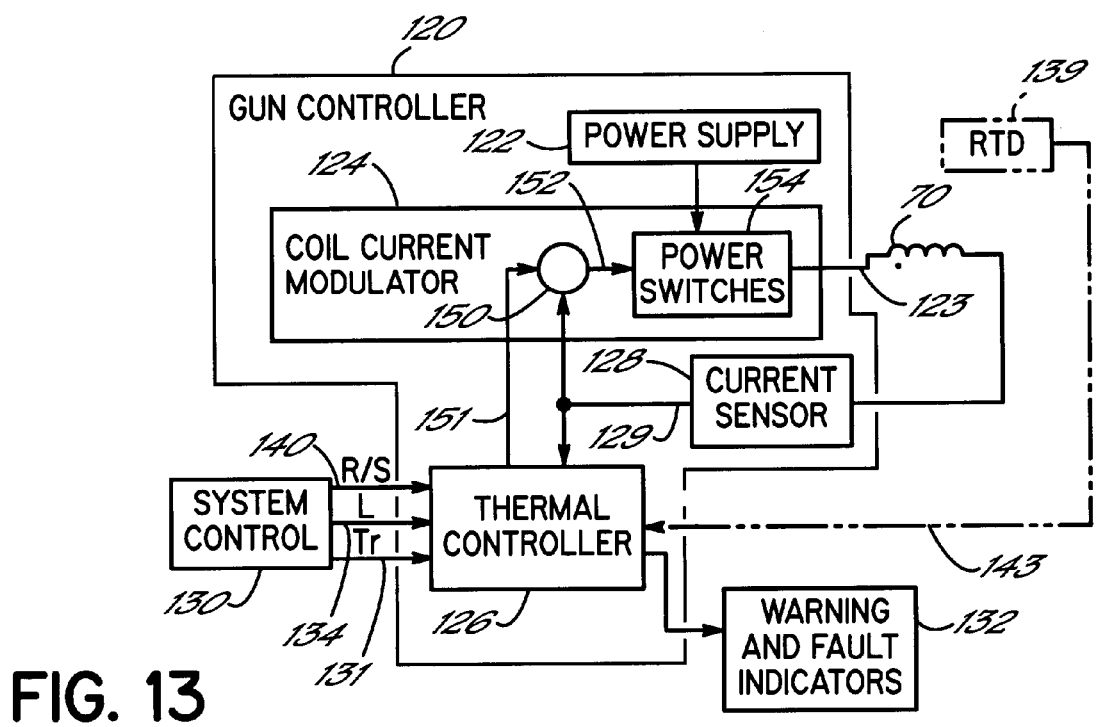
FIG. 13 is a schematic block diagram of an alternative embodiment of a gun controller with a thermal controller for controlling the temperature of the dispensing valve coil in accordance with the principles of the present invention.

An alternative embodiment is illustrated in FIG. 13 in which a temperature control is provided by maintaining a constant temperature during only the run mode of operation. The embodiment of FIG. 13 is identical to the embodiment of FIG. 3 except that there is no bifilar coil and coil switching circuits, and thus, the operation of the apparatus of FIG. 13 is identical to the operation of the apparatus of FIG. 3 except with respect to the standby mode of operation. The embodiment of FIG. 13 does not heat the coil 70 during the standby mode of operation. The embodiment can be operated in a learn mode to determine a maximum current or power being consumed by the dispensing gun to establish a power, current or temperature setpoint. In the run mode of operation, a current feedback is provided to the thermal controller 126, and a waveform generator 148 as previously described provides a stepped current waveform to the coil current modulator 124. The coil current modulator 124 provides a drive current to the coil 70 to maintain a current or power in the coil substantially equal to the respective current or power setpoint. Thus, the coil 70 is first operative to actuate the dispensing valve 33 (FIG. 1) to dispense the fluid and is used simultaneously as a heater in the run mode to maintain the temperature of the coil generally constant. As previously described, the values of the peak current $I_{pk}$, hold current $I_h$, time width $T_{pk}$ and other current waveform variables, may be adjusted to change the RMS value of the current being supplied to the coil 70. As will also be appreciated, all of the different embodiments of the thermal controller 126 illustrated and described with respect to FIGS. 4, 6, 7 and 9 including the use of current sampling during the off-time of the current waveform as shown and described with respect to FIGS. 2B–2D are equally applicable to the embodiment of FIG. 13. Hence, the thermal controller 126 of FIG. 13 can be implemented with a power control loop as described with respect to FIG. 4, with a current control loop as described with respect to FIG. 6, or with a temperature control loop as illustrated in FIGS. 7A and 7B. Alternatively, a Peltier device 181 (FIG. 9) can be used only in the run mode to maintain the coil at a constant temperature.

Thus, the embodiment of FIG. 13 maintains the coil 70 at a desired temperature during the run mode of operation; and during the run mode, all of the advantages of having a constant temperature dispensing gun are realized by using the embodiment of FIG. 13. With the embodiment of FIG. 13, the temperature of the coil 70 and the dispensing gun 10 most probably decreases during the standby mode. And, when the run mode is again activated, the temperature of the coil 70 and the dispensing gun 10 increases until it reaches the desired value. Thus, the embodiment of FIG. 13 allows for some temperature variations and the disadvantages associated therewith. However, the embodiment of FIG. 13 in providing for temperature control during only the run mode provides many of the previously described advantages over known devices.

Further, the embodiments illustrated with respect to FIGS. 3–7 and 13 are described as being implemented using digital processors and/or controllers; however, as will be appreciated, one skilled in the art may choose to implement portions or the entirety of those embodiments with analog devices.

Therefore, the invention in its broadest aspects is not limited to the specific detail shown and described. Consequently, departures may be made from the details described herein without departing from the spirit and scope of the claims which follow.

What is claimed is:

1. A temperature monitor for monitoring a temperature of an electrically operated fluid dispenser having a coil mounted adjacent an armature, the coil selectively generating an electromagnetic field to move the armature between opened and closed positions, the temperature monitor comprising:

a current measuring circuit for measuring a current in the coil;

a comparator for comparing a measured current to a reference current, said measured and reference currents representing measured and reference temperatures, respectively; and an indicator device providing an indication representing a relationship between the measured temperature and the reference temperature.

2. A temperature monitor of claim 1 wherein said current measuring circuit comprises a current measuring device for measuring an average value of said current in the coil.

3. A temperature monitor of claim 1 wherein said current measuring circuit comprises a current measuring device for measuring an RMS value of said current in the coil.

4. A temperature monitor of claim 1 wherein said current measuring circuit comprises an integrated circuit chip for measuring an RMS value of said current in the coil.

5. A temperature monitor of claim 1 wherein said comparator comprises circuitry for comparing said measured current to a plurality of reference current values.

6. A temperature monitor of claim 1 wherein said indicator device comprises an indication representing one of a measured value of the temperature exceeding the reference value of the temperature and a measured value of the temperature near but not exceeding the reference value of the temperature.

7. A method for monitoring a temperature of an electrically operated fluid dispenser having a coil mounted adjacent an armature, the coil generating an electromagnetic field to move the armature between opened and closed positions, the method comprising:
   providing a measured current value representing a current in the coil;
   comparing a measured current value to a desired current value, the measured and reference current values representing measured and reference temperatures of the coil, respectively; and
   providing an indication representing a relationship between the measured temperature and the reference temperature.

8. A method of claim 7 further comprising measuring an RMS value of the current.

9. A method of claim 7 further providing an indication representing one of a measured temperature exceeding the reference temperature and a measured temperature near but not exceeding the reference temperature.

10. A temperature monitor for monitoring a temperature of an electrically operated fluid dispenser having a coil mounted adjacent an armature, the coil selectively generating an electromagnetic field to move the armature between opened and closed positions, the temperature monitor comprising:
    a first circuit for providing a current signal representing current in the coil;
    a comparator electrically connected to the first circuit for comparing the current signal to a current reference, said current signal and current reference representing temperatures of the coil; and
    an indicator device electrically connected to the comparator for providing a qualitative indication of a temperature of the coil.

11. A temperature monitor for monitoring a temperature of an electrically operated fluid dispenser having a coil mounted adjacent an armature, the coil selectively generating an electromagnetic field to move the armature between opened and closed positions, the temperature monitor comprising:
    a first circuit for providing a current signal representing current in the coil;
    a comparator electrically connected to the first circuit for comparing the current signal to a maximum current, said current signal and maximum current representing respectively, a detected temperature of the coil and a specified maximum temperature of the coil; and
    a first indicator electrically connected to the comparator for providing a first indication representing a temperature exceeding the specified maximum temperature of the coil.

12. A temperature monitor of claim 11 wherein the current signal is a DC current signal representing an RMS current in the coil.

13. A temperature monitor of claim 11 wherein the comparator compares the current signal to a reference current less than the maximum current, said reference current representing a reference temperature of the coil less than the specified maximum temperature of the coil, and the temperature monitor further comprises a second indicator electrically connected to the comparator for providing a second indication representing a temperature between the specified maximum temperature of the coil and the reference temperature.

14. A temperature monitor of claim 13 further comprising a third indicator electrically connected to the second comparator for providing a third indication representing a temperature less than the reference temperature.

15. A temperature monitor of claim 14 wherein the first, second and third indicators are respectively red, yellow and green indicators.

16. A method for monitoring a temperature of an electrically operated fluid dispenser having a coil mounted adjacent an armature, the coil generating an electromagnetic field to move the armature between opened and closed positions, the method comprising:
    providing a current signal representing a current in the coil;
    comparing the current signal to current reference, the current signal and current reference representing temperatures of the coil; and
    providing an indication representing a qualitative indication of the temperature of the coil.

17. The method of claim 16 further comprising providing a DC current signal representing an RMS current in the coil.

18. A method for monitoring a temperature of an electrically operated fluid dispenser having a coil mounted adjacent an armature, the coil generating an electromagnetic field to move the armature between opened and closed positions, the method comprising:
    providing a current signal representing a current in the coil;
    providing a maximum current value representing a specified maximum temperature of the coil;
    comparing the current signal to the maximum current value; and
    providing a first indication in response to the current signal exceeding the maximum current value.

19. The method of claim 18 further comprising:
    providing an intermediate current value representing a reference temperature of the coil less than the specified maximum temperature of the coil;
    comparing the current signal to the intermediate current value; and
    providing a second indication in response to the current signal being between the intermediate and the maximum current values.

20. The method of claim 19 further comprising providing a third indication in response to the current signal being less than the intermediate current value.

* * * * *